(12) United States Patent
Suzuki

(10) Patent No.: US 7,440,931 B1
(45) Date of Patent: Oct. 21, 2008

(54) METHOD AND APPARATUS FOR ANALYZING THOUGHT SYSTEM

(75) Inventor: Kazuhiko Suzuki, Ota-Ku (JP)

(73) Assignee: Creative Brains, K.K., Tokyo (JP)

( * ) Notice: Subject to any disclaimer, the term of this patent is extended or adjusted under 35 U.S.C. 154(b) by 1696 days.

(21) Appl. No.: 09/612,522

(22) Filed: Jul. 6, 2000

(30) Foreign Application Priority Data

Nov. 26, 1999 (JP) ................. 11-335553

(51) Int. Cl.
*G06F 17/00* (2006.01)
*G06N 5/02* (2006.01)

(52) U.S. Cl. .................................. 706/46

(58) Field of Classification Search .......... 345/854, 345/853; 706/46
See application file for complete search history.

(56) References Cited

U.S. PATENT DOCUMENTS

| | | | |
|---|---|---|---|
| 4,839,853 A | | 6/1989 | Deerwester et al. |
| 5,778,362 A | | 7/1998 | Deerwester |
| 5,857,179 A | | 1/1999 | Vaithyanathan et al. |
| 6,031,537 A | * | 2/2000 | Hugh .................. 345/854 |
| 6,037,944 A | * | 3/2000 | Hugh .................. 715/854 |
| 6,138,116 A | * | 10/2000 | Kitagawa et al. .......... 707/5 |
| 6,166,739 A | * | 12/2000 | Hugh .................. 345/854 |
| 6,256,032 B1 | * | 7/2001 | Hugh .................. 345/854 |
| 6,701,526 B1 | * | 3/2004 | Trovato ................ 725/39 |
| 6,710,090 B2 | * | 3/2004 | Koyama et al. .......... 514/690 |
| 6,760,537 B2 | * | 7/2004 | Mankovitz ............ 386/83 |
| 6,821,735 B1 | * | 11/2004 | Blatt et al. ............ 435/7.1 |
| 6,865,291 B1 | * | 3/2005 | Zador ................ 382/166 |
| 6,873,325 B1 | * | 3/2005 | Kontkanen et al. ........ 345/440 |

(Continued)

FOREIGN PATENT DOCUMENTS

JP   A 05-143342   6/1993

(Continued)

OTHER PUBLICATIONS

Re-evaluating systems engineering concepts using systems thinking Bahill, A.T.; Gissing, B.; Systems, Man, and Cybernetics, Part C: Applications and Reviews, IEEE Transactions on vol. 28, Issue 4, Nov. 1998 pp. 516-527 Digital Object Identifier 10.1109/5326.725338.*

(Continued)

*Primary Examiner*—Michael B Holmes
(74) *Attorney, Agent, or Firm*—Oliff & Berridge, PLC

(57) ABSTRACT

A method for analyzing a thought system of a subject consisting of at least one individual is disclosed. The analyzing method comprising the steps of: obtaining a plurality of items perceived by the subject; obtaining relationship information of all possible item pairs based on perception of the subject with respect to relationship between two items of each of said all possible item pairs; generating a relation matrix of the plurality of items based on the relationship information of each of the items with respect to the all other items; transforming the relation matrix to a display matrix projected on a representation space having dimensions lower than the number of the items and reflecting a relationship between the items perceived by the subject; and displaying the items on the representation space according to the display matrix such that the items are plotted on respective positions in the representation. An apparatus for analyzing a thought system of a subject which is adapted to perform the present analyzing method is also disclosed.

100 Claims, 28 Drawing Sheets

U.S. PATENT DOCUMENTS

| | | | |
|---|---|---|---|
| 6,897,978 B1 * | 5/2005 | Ohta | 358/1.9 |
| 6,916,096 B2 * | 7/2005 | Eberl et al. | 351/209 |
| 6,952,688 B1 * | 10/2005 | Goldman et al. | 706/45 |
| 7,010,035 B2 * | 3/2006 | Shen et al. | 375/240.03 |
| 7,203,809 B2 * | 4/2007 | Takeda | 711/167 |
| 7,203,910 B1 * | 4/2007 | Hugh et al. | 715/804 |
| 7,219,449 B1 * | 5/2007 | Hoffberg et al. | 36/88 |
| 2002/0054167 A1 * | 5/2002 | Hugh | 345/854 |
| 2002/0067381 A1 * | 6/2002 | Hugh | 345/854 |
| 2002/0089551 A1 * | 7/2002 | Hugh | 345/853 |

FOREIGN PATENT DOCUMENTS

| | | |
|---|---|---|
| JP | A 05-257923 | 10/1993 |
| JP | A 09-305615 | 11/1997 |
| JP | A 10-228481 | 8/1998 |
| JP | A 11-296502 | 10/1999 |
| WO | WO 98/20431 | 5/1998 |

OTHER PUBLICATIONS

If you Always Thought Systems Software Upstaged Systems Engineering at CSC, Just Answer this Ad . . . Computer vol. 12, Issue 12, Dec. 1979 pp. 137-137.*

Collaborative technologies: Cognitive apprenticeship, training, and education Jones, Keith W.; Kristof, Dale; Jenkins, Larry C.; Ramsey, Jeffry; Patrick, Dale; Burnham, Samuel; Turner, I. Leon; Collaborative Technologies and Systems, 2008. CTS 2008. International Symposium on May 19-23, 2008 pp. 452-459 Digital Object Identifier 10.1109/CTS.2.*

Empirical Research on Systems Thinking and Practice in the Engineering Enterprise Rhodes, Donna H.; Lamb, Caroline T.; Nightingale, Deborah J.; Systems Conference, 2008 2nd Annual IEEE Apr. 7-10, 2008 pp. 1-8 Digital Object Identifier 10.1109/Systems.2008. 4519015.*

Systems Thinking as an Emergent Team Property: Ongoing research into the enablers and barriers to team-level systems thinking Lamb, Caroline Twomey; Rhodes, Donna H.; Systems Conference, 2008 2nd Annual IEEE Apr. 7-10, 2008 pp. 1-7 Digital Object Identifier 10.1109/Systems.2008.4519016.*

Technology Management in Innovative Organization: A System Dynamics based Perspective Dharmaraj, N.; Rodrigues, L.L.R.; Shrinivasa Rao, B.R.; Management of Innovation and Technology, 2006 IEEE International Conference on vol. 2, Jun. 2006 pp. 1059-1062 Digital Object Identifier 10.1109/ICMIT.2006.262384.*

IT Projects: Conflict, Governance, and Systems Thinking Johnstone, D.; Huff, S.; Hope, B.; System Sciences, 2006. HICSS '06. Proceedings of the 39th Annual Hawaii International Conference on vol. 8, Jan. 4-7, 2006 pp. 197b-197b Digital Object Identifier 10.1109/HICSS.2006.235.*

How engineers can manage tomorrow's technology Chasteen, L.; Engineering Management Conference, 2004 IEEE/UT Aug. 12-13, 2004 pp. 21-25 Digital Object Identifier 10.1109/UTEMC.2004. 1633388.*

Supply chain analysis thinking Ludema, M.W.; Systems, Man and Cybernetics, 2003. IEEE International Conference on vol. 5, Oct. 5-8, 2003 pp. 4566-4571 vol. 5.*

System engineering equals strategic thinking: why engineers should manage tomorrow's new technology Chasteen, L.; Change Management and the New Industrial Revolution, 2001. IEMC '01 Proceedings. Oct 7-9, 2001 pp. 292-297 Digital Object Identifier 10.1109/IEMC.2001.960541.*

A connectionist inference mechanism for a natural language understanding system Lalitrojwong, P.; Buchheit, P.; Evens, M.W.; Information Intelligence and Systems, 1999. Proceedings. 1999 International Conference on Oct. 31-Nov. 3, 1999 pp. 570-573 Digital Object Identifier 10.1109/ICIIS.1999.810349.*

Intelligent laser materials processing: atom to application Mazumder, J.; Lasers and Electro-Optics, 1996. CLEO '96., Summaries of papers presented at the Conference on Jun. 2-7, 1996 pp. 350-351.*

Knowledge extraction changes the way an expert thinks Bahill, A.T.; Bharathan, K.; Curlee, R.F.; Systems, Man and Cybernetics, 1992., IEEE International Conference on Oct. 18-21, 1992 pp. 917-921 vol. 1 Digital Object Identifier 10.1109/ICSMC.1992.271676.*

Medical decision making and systems thinking Young, M.J.; Systems, Man, and Cybernetics, 1991. 'Decision Aiding for Complex Systems, Conference Proceedings., 1991 IEEE International Conference on Oct. 13-16, 1991 pp. 2099-2102 vol. 3 Digital Object Identifier 10.1109/ICSMC.1991.169920.*

Intelligent network operations systems for INS network Fujimoto, K.; Minato, Y.; Communications, 1988. ICC 88. Digital Technology—Spanning the Universe. Conference Record. IEEE International Conference on Jun. 12-15, 1988 pp. 1768-1772 vol. 3 Digital Object Identifier 10.1109/ICC.1988.13849.*

Kazuyuki FJII, "New Concept for the Human Intelligence (III), Component of New Concept." Jan. 17, 1992, pp. 1-8. w/abstract.

Kazushi Nishimoto et al., "A Method to Retrieve Information Having Different Relevance for Supporting Human Divergent Thinking." Technical Papers, vol. 11, No. 6, Jul. 10, 1995, pp. 896-904. w/abstract.

* cited by examiner

FIG.7(a)

| Seq. No. | Row item | Col item |
|---|---|---|
| 1 | 1 | 9 |
| 2 | 2 | 3 |
| 3 | 4 | 5 |
| 4 | 6 | 7 |
| 5 | 8 | 9 |
| 6 | 1 | 2 |
| 7 | 3 | 4 |
| 8 | 5 | 6 |
| 9 | 7 | 8 |
| 10 | 1 | 3 |
| 11 | 2 | 4 |
| 12 | 3 | 5 |
| 13 | 4 | 6 |
| 14 | 5 | 7 |
| 15 | 6 | 8 |
| 16 | 7 | 9 |
| 17 | 1 | 4 |
| 18 | 2 | 5 |
| 19 | 3 | 6 |
| 20 | 4 | 7 |
| 21 | 5 | 8 |
| 22 | 6 | 9 |
| 23 | 1 | 5 |
| 24 | 2 | 6 |
| 25 | 3 | 7 |
| 26 | 4 | 8 |
| 27 | 5 | 9 |
| 28 | 1 | 6 |
| 29 | 2 | 7 |
| 30 | 3 | 8 |
| 31 | 4 | 9 |
| 32 | 1 | 7 |
| 33 | 2 | 8 |
| 34 | 3 | 9 |
| 35 | 1 | 8 |
| 36 | 2 | 9 |

FIG.7(b)

|   | 1 | 2 | 3 | 4 | 5 | 6 | 7 | 8 | 9 |
|---|---|---|---|---|---|---|---|---|---|
| 1 |   | 1*2 | 1*3 | 1*4 | 1*5 | 1*6 | 1*7 | 1*8 | 1*9 |
| 2 |   |   | 2*3 | 2*4 | 2*5 | 2*6 | 2*7 | 2*8 | 2*9 |
| 3 |   |   |   | 3*4 | 3*5 | 3*6 | 3*7 | 3*8 | 3*9 |
| 4 |   |   |   |   | 4*5 | 4*6 | 4*7 | 4*8 | 4*9 |
| 5 |   |   |   |   |   | 5*6 | 5*7 | 5*8 | 5*9 |
| 6 |   |   |   |   |   |   | 6*7 | 6*8 | 6*9 |
| 7 |   |   |   |   |   |   |   | 7*8 | 7*9 |
| 8 |   |   |   |   |   |   |   |   | 8*9 |
| 9 |   |   |   |   |   |   |   |   |   |

FIG.7(c)

|   | 1 | 2 | 3 | 4 | 5 | 6 | 7 | 8 | 9 |
|---|---|---|---|---|---|---|---|---|---|
| 1 |   | 6 | 10 | 17 | 23 | 28 | 32 | 35 | 1 |
| 2 |   |   | 2 | 11 | 18 | 24 | 29 | 33 | 36 |
| 3 |   |   |   | 7 | 12 | 19 | 25 | 30 | 34 |
| 4 |   |   |   |   | 3 | 13 | 20 | 26 | 31 |
| 5 |   |   |   |   |   | 8 | 14 | 21 | 27 |
| 6 |   |   |   |   |   |   | 4 | 15 | 22 |
| 7 |   |   |   |   |   |   |   | 9 | 16 |
| 8 |   |   |   |   |   |   |   |   | 5 |
| 9 |   |   |   |   |   |   |   |   |   |

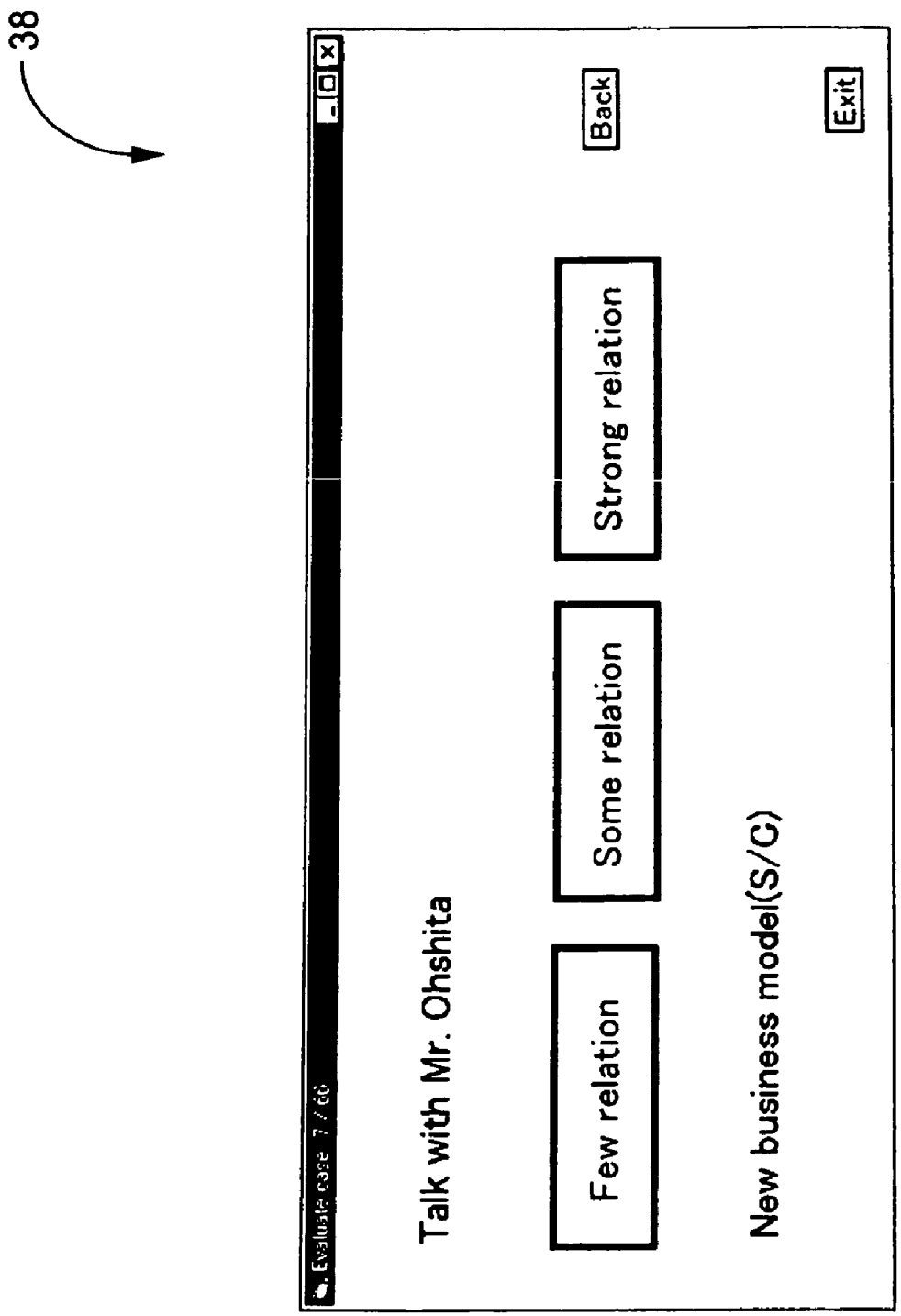

| | TV Exposure | Profit | Engine problem | Sponsorship | Gut feeling | Data to support | Air temperature | Head Gasket | Luck | Success | Take Risk |
|---|---|---|---|---|---|---|---|---|---|---|---|
| TV Exposure | 3 | 2 | 0 | 2 | 0 | 0 | 0 | 0 | 1 | 2 | 2 |
| Profit | 2 | 3 | 2 | 2 | 0 | 0 | 0 | 0 | 2 | 2 | 2 |
| Engine problem | 0 | 2 | 3 | 2 | 1 | 2 | 2 | 2 | 0 | 2 | 2 |
| Sponsorship | 2 | 2 | 2 | 3 | 0 | 0 | 0 | 0 | 1 | 2 | 1 |
| Gut feeling | 0 | 0 | 1 | 0 | 3 | 0 | 2 | 2 | 0 | 0 | 0 |
| Data to support | 0 | 0 | 2 | 0 | 0 | 3 | 2 | 2 | 0 | 0 | 1 |
| Air temperature | 0 | 0 | 2 | 0 | 2 | 2 | 3 | 2 | 1 | 1 | 2 |
| Head Gasket | 0 | 0 | 2 | 0 | 2 | 2 | 2 | 3 | 1 | 1 | 2 |
| Luck | 1 | 2 | 0 | 1 | 0 | 0 | 1 | 1 | 3 | 0 | 1 |
| Success | 2 | 2 | 2 | 2 | 0 | 0 | 1 | 1 | 0 | 3 | 0 |
| Take Risk | 2 | 2 | 2 | 1 | 0 | 1 | 2 | 2 | 1 | 0 | 3 |

FIG.17

| Item | Relative marginal frequency | axis #1 (X) | | | axis #2 (Y) | | | axis #3 (Z) | | | Cluster |
|---|---|---|---|---|---|---|---|---|---|---|---|
| | | Coordinate | Absolute contribution | Relative contribution | Coordinate | Absolute contribution | Relative contribution | Coordinate | Absolute contribution | Relative contribution | |
| TV Exposure | 0.083 | −0.890 | 0.146 | 0.795 | 0.115 | 0.009 | 0.013 | −0.007 | 0.000 | 0.000 | 2 |
| Profit | 0.103 | −0.701 | 0.113 | 0.877 | 0.045 | 0.002 | 0.004 | 0.089 | 0.007 | 0.014 | 2 |
| Engine problem | 0.124 | 0.190 | 0.010 | 0.178 | −0.156 | 0.023 | 0.119 | −0.281 | 0.088 | 0.386 | 3 |
| Sponsorship | 0.090 | −0.757 | 0.114 | 0.816 | 0.079 | 0.004 | 0.009 | −0.244 | 0.048 | 0.085 | 2 |
| Gut feeling | 0.055 | 1.266 | 0.197 | 0.556 | 1.107 | 0.522 | 0.425 | −0.084 | 0.004 | 0.002 | 1 |
| Data to support | 0.069 | 0.846 | 0.110 | 0.480 | −0.848 | 0.383 | 0.482 | −0.062 | 0.002 | 0.003 | 3 |
| Air temperature | 0.103 | 0.700 | 0.113 | 0.880 | 0.006 | 0.000 | 0.000 | 0.077 | 0.006 | 0.011 | 3 |
| Head Gasket | 0.103 | 0.700 | 0.113 | 0.880 | 0.006 | 0.000 | 0.000 | 0.077 | 0.006 | 0.011 | 3 |
| Luck | 0.069 | −0.458 | 0.032 | 0.174 | 0.128 | 0.009 | 0.014 | 0.936 | 0.544 | 0.726 | 2 |
| Success | 0.090 | −0.510 | 0.052 | 0.384 | 0.107 | 0.008 | 0.017 | −0.548 | 0.242 | 0.443 | 2 |
| Take Risk | 0.110 | −0.048 | 0.001 | 0.009 | −0.220 | 0.041 | 0.199 | 0.232 | 0.053 | 0.221 | 2 |
| TV Exposure | 0.083 | −0.890 | 0.146 | 0.795 | 0.115 | 0.009 | 0.013 | −0.007 | 0.000 | 0.000 | 2 |
| Profit | 0.103 | −0.701 | 0.113 | 0.877 | 0.045 | 0.002 | 0.004 | 0.089 | 0.007 | 0.014 | 2 |
| Engine problem | 0.124 | 0.190 | 0.010 | 0.178 | −0.156 | 0.023 | 0.119 | −0.281 | 0.088 | 0.386 | 3 |
| Sponsorship | 0.090 | −0.757 | 0.114 | 0.816 | 0.079 | 0.004 | 0.009 | −0.244 | 0.048 | 0.085 | 2 |
| Gut feeling | 0.055 | 1.266 | 0.197 | 0.556 | 1.107 | 0.522 | 0.425 | −0.084 | 0.004 | 0.002 | 1 |
| Data to support | 0.069 | 0.846 | 0.110 | 0.480 | −0.848 | 0.383 | 0.482 | −0.062 | 0.002 | 0.003 | 3 |
| Air temperature | 0.103 | 0.700 | 0.113 | 0.880 | 0.006 | 0.000 | 0.000 | 0.077 | 0.006 | 0.011 | 3 |
| Head Gasket | 0.103 | 0.700 | 0.113 | 0.880 | 0.006 | 0.000 | 0.000 | 0.077 | 0.006 | 0.011 | 3 |
| Luck | 0.069 | −0.458 | 0.032 | 0.174 | 0.128 | 0.009 | 0.014 | 0.936 | 0.544 | 0.726 | 2 |
| Success | 0.090 | −0.510 | 0.052 | 0.384 | 0.107 | 0.008 | 0.017 | −0.548 | 0.242 | 0.443 | 2 |
| Take Risk | 0.110 | −0.048 | 0.001 | 0.009 | −0.220 | 0.041 | 0.199 | 0.232 | 0.053 | 0.221 | 2 |

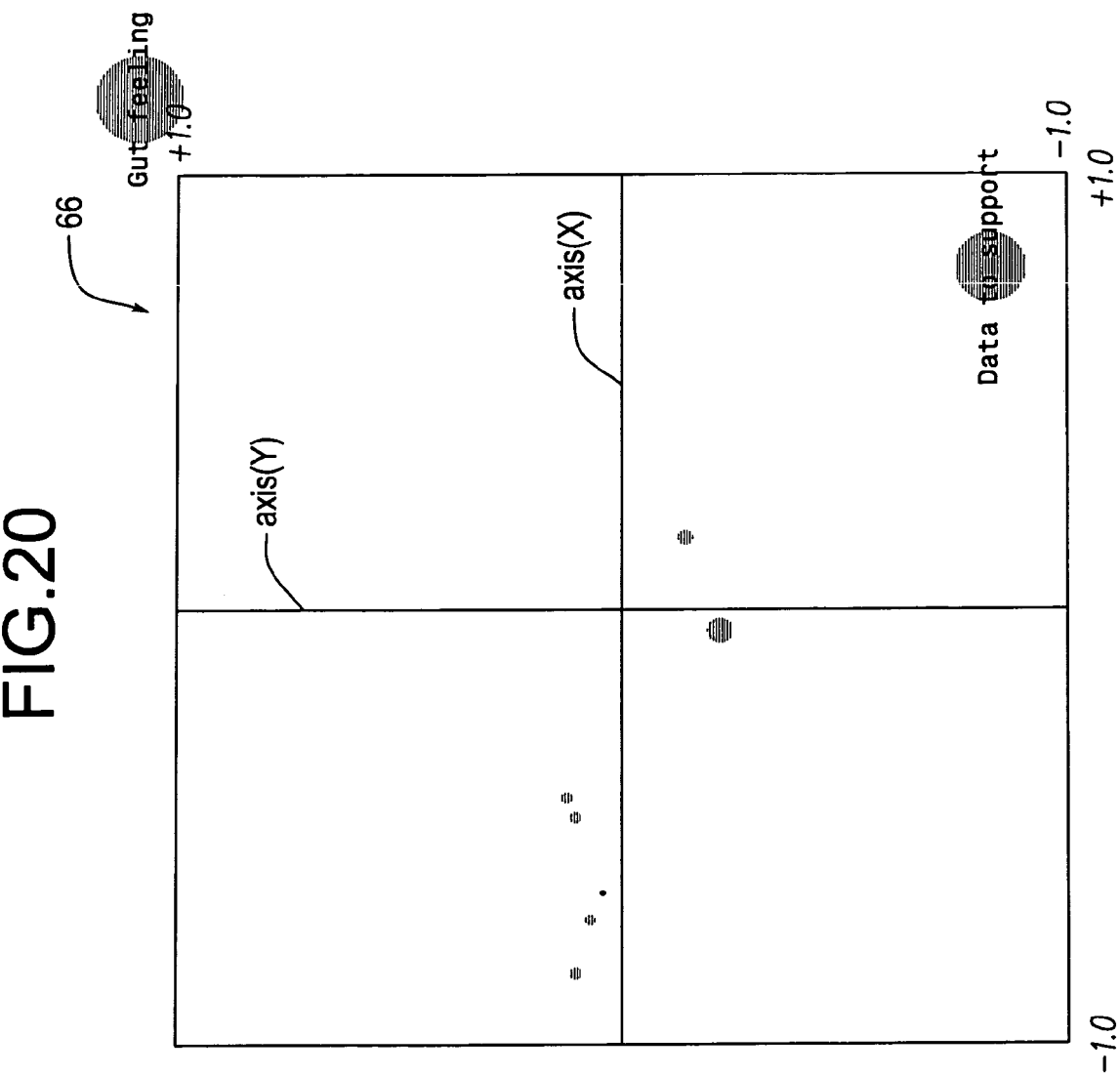

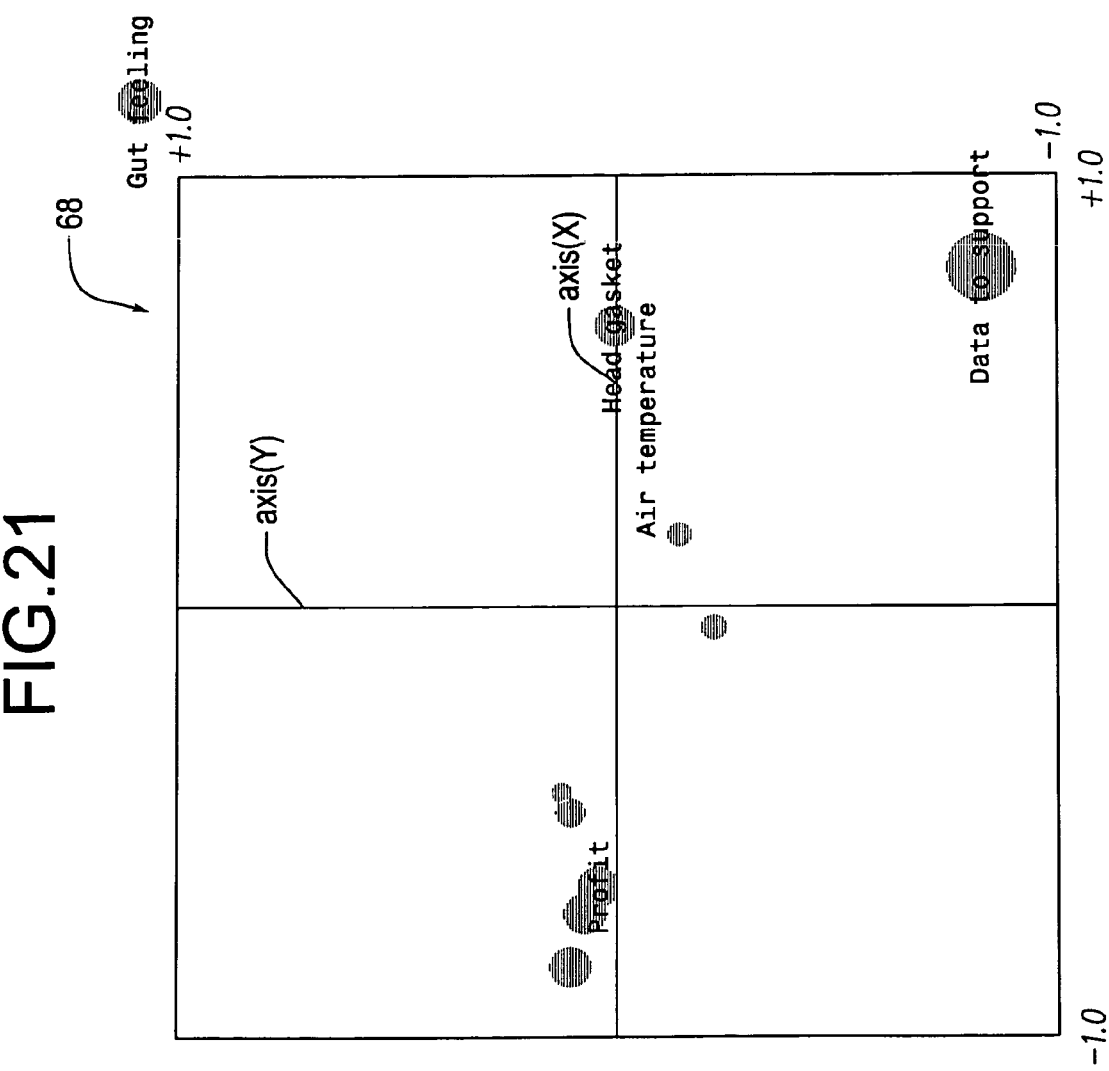

FIG.22

|  | TV Exposure | Profit | Engine problem | Sponsorship | Gut feeling | Data to support | Air temperature | Head Gasket | Luck | Success | Take Risk |
|---|---|---|---|---|---|---|---|---|---|---|---|
| TV Exposure/A | 3 | 2 | 0 | 2 | 0 | 0 | 0 | 0 | 1 | 2 | 2 |
| Profit/A | 2 | 3 | 2 | 2 | 0 | 0 | 0 | 0 | 2 | 2 | 2 |
| Engine problem/A | 0 | 2 | 3 | 2 | 1 | 2 | 2 | 2 | 0 | 2 | 2 |
| Sponsorship/A | 2 | 2 | 2 | 3 | 0 | 0 | 0 | 0 | 1 | 2 | 1 |
| Gut feeling/A | 0 | 0 | 1 | 0 | 3 | 0 | 2 | 2 | 0 | 0 | 0 |
| Data to support/A | 0 | 0 | 2 | 0 | 0 | 3 | 2 | 2 | 0 | 0 | 1 |
| Air temperature/A | 0 | 0 | 2 | 0 | 2 | 2 | 3 | 2 | 1 | 1 | 2 |
| Head Gasket/A | 0 | 0 | 2 | 0 | 2 | 2 | 2 | 3 | 1 | 1 | 2 |
| Luck/A | 1 | 2 | 0 | 1 | 0 | 0 | 1 | 1 | 3 | 0 | 1 |
| Success/A | 2 | 2 | 2 | 2 | 0 | 0 | 1 | 1 | 0 | 3 | 0 |
| Take Risk/A | 2 | 2 | 2 | 1 | 0 | 1 | 2 | 2 | 1 | 0 | 3 |
| TV Exposure/B | 3 | 2 | 1 | 2 | 0 | 0 | 0 | 0 | 0 | 1 | 1 |
| Profit/B | 2 | 3 | 0 | 2 | 0 | 0 | 1 | 1 | 2 | 2 | 2 |
| Engine problem/B | 1 | 0 | 3 | 1 | 1 | 2 | 2 | 2 | 0 | 1 | 2 |
| Sponsorship/B | 2 | 2 | 1 | 3 | 0 | 0 | 0 | 0 | 1 | 2 | 1 |
| Gut feeling/B | 0 | 0 | 1 | 0 | 3 | 0 | 1 | 1 | 1 | 1 | 1 |
| Data to support/B | 0 | 0 | 2 | 0 | 0 | 3 | 1 | 1 | 1 | 1 | 1 |
| Air temperature/B | 0 | 1 | 2 | 0 | 1 | 1 | 3 | 1 | 0 | 1 | 1 |
| Head Gasket/B | 0 | 1 | 2 | 0 | 1 | 1 | 1 | 3 | 0 | 0 | 1 |
| Luck/B | 0 | 2 | 0 | 1 | 1 | 1 | 0 | 0 | 3 | 1 | 1 |
| Success/B | 1 | 2 | 1 | 2 | 1 | 1 | 1 | 0 | 1 | 3 | 1 |
| Take Risk/B | 1 | 2 | 2 | 1 | 1 | 1 | 1 | 1 | 1 | 1 | 3 |

FIG.23

|  | TV Exposure | Profit | Engine problem | Sponsorship | Gut feeling | Data to support | Air temperature | Head Gasket | Luck | Success | Take Risk |
|---|---|---|---|---|---|---|---|---|---|---|---|
| TV Exposure | 6 | 4 | 1 | 4 | 0 | 0 | 0 | 0 | 1 | 3 | 3 |
| Profit | 4 | 6 | 2 | 4 | 0 | 0 | 1 | 1 | 4 | 4 | 4 |
| Engine problem | 1 | 2 | 6 | 3 | 2 | 4 | 4 | 4 | 0 | 3 | 4 |
| Sponsorship | 4 | 4 | 3 | 6 | 0 | 0 | 0 | 0 | 2 | 4 | 2 |
| Gut feeling | 0 | 0 | 2 | 0 | 6 | 0 | 3 | 3 | 1 | 1 | 1 |
| Data to support | 0 | 0 | 4 | 0 | 0 | 6 | 3 | 3 | 1 | 1 | 2 |
| Air temperature | 0 | 1 | 4 | 0 | 3 | 3 | 6 | 3 | 1 | 2 | 3 |
| Head Gasket | 0 | 1 | 4 | 0 | 3 | 3 | 3 | 6 | 1 | 1 | 3 |
| Luck | 1 | 4 | 0 | 2 | 1 | 1 | 1 | 1 | 6 | 1 | 2 |
| Success | 3 | 4 | 3 | 4 | 1 | 1 | 2 | 1 | 1 | 6 | 1 |
| Take Risk | 3 | 4 | 4 | 2 | 1 | 2 | 3 | 3 | 2 | 1 | 6 |

| Item | Relative marginal frequency | axis #1 (X) | | | axis #2 (Y) | | | axis #3 (Z) | | | Cluster |
|---|---|---|---|---|---|---|---|---|---|---|---|
| | | Coordinate | Absolute contribution | Relative contribution | Coordinate | Absolute contribution | Relative contribution | Coordinate | Absolute contribution | Relative contribution | |
| TV Exposure | 0.083 | -0.907 | 0.173 | 0.819 | -0.022 | 0.000 | 0.000 | -0.246 | 0.057 | 0.060 | 1 |
| Profit | 0.103 | -0.623 | 0.111 | 0.893 | 0.067 | 0.004 | 0.010 | 0.158 | 0.032 | 0.057 | 1 |
| Engine problem | 0.124 | 0.323 | 0.033 | 0.500 | -0.223 | 0.050 | 0.238 | -0.191 | 0.051 | 0.175 | 2 |
| Sponsorship | 0.090 | -0.789 | 0.149 | 0.865 | -0.022 | 0.000 | 0.001 | -0.194 | 0.040 | 0.052 | 1 |
| Gut feeling | 0.055 | 0.905 | 0.133 | 0.425 | 1.015 | 0.532 | 0.535 | -0.237 | 0.041 | 0.029 | 2 |
| Data to support | 0.069 | 0.742 | 0.105 | 0.453 | -0.747 | 0.339 | 0.460 | 0.209 | 0.037 | 0.036 | 2 |
| Air temperature | 0.103 | 0.662 | 0.109 | 0.837 | 0.015 | 0.000 | 0.000 | -0.037 | 0.002 | 0.003 | 2 |
| Head Gasket | 0.103 | 0.726 | 0.126 | 0.854 | 0.017 | 0.000 | 0.000 | 0.032 | 0.001 | 0.002 | 2 |
| Luck | 0.069 | -0.369 | 0.026 | 0.137 | 0.325 | 0.064 | 0.106 | 0.852 | 0.618 | 0.729 | 1 |
| Success | 0.090 | -0.383 | 0.038 | 0.415 | -0.005 | 0.000 | 0.000 | -0.306 | 0.108 | 0.266 | 1 |
| Take Risk | 0.110 | -0.005 | 0.000 | 0.000 | -0.100 | 0.010 | 0.075 | 0.100 | 0.013 | 0.074 | |
| TV Exposure | 0.083 | -0.907 | 0.173 | 0.819 | -0.022 | 0.000 | 0.000 | -0.246 | 0.057 | 0.060 | 1 |
| Profit | 0.103 | -0.623 | 0.111 | 0.893 | 0.067 | 0.004 | 0.010 | 0.158 | 0.032 | 0.057 | 1 |
| Engine problem | 0.124 | 0.323 | 0.033 | 0.500 | -0.223 | 0.050 | 0.238 | -0.191 | 0.051 | 0.175 | 2 |
| Sponsorship | 0.090 | -0.789 | 0.149 | 0.865 | -0.022 | 0.000 | 0.001 | -0.194 | 0.040 | 0.052 | 1 |
| Gut feeling | 0.055 | 0.905 | 0.133 | 0.425 | 1.015 | 0.532 | 0.535 | -0.237 | 0.041 | 0.029 | 2 |
| Data to support | 0.069 | 0.742 | 0.105 | 0.453 | -0.747 | 0.339 | 0.460 | 0.209 | 0.037 | 0.036 | 2 |
| Air temperature | 0.103 | 0.662 | 0.109 | 0.837 | 0.015 | 0.000 | 0.000 | -0.037 | 0.002 | 0.003 | 2 |
| Head Gasket | 0.103 | 0.726 | 0.126 | 0.854 | 0.017 | 0.000 | 0.000 | 0.032 | 0.001 | 0.002 | 2 |
| Luck | 0.069 | -0.369 | 0.026 | 0.137 | 0.325 | 0.064 | 0.106 | 0.852 | 0.618 | 0.729 | 1 |
| Success | 0.090 | -0.383 | 0.038 | 0.415 | -0.005 | 0.000 | 0.000 | -0.306 | 0.108 | 0.266 | 1 |
| Take Risk | 0.110 | -0.005 | 0.000 | 0.000 | -0.100 | 0.010 | 0.075 | 0.100 | 0.013 | 0.074 | 1 |

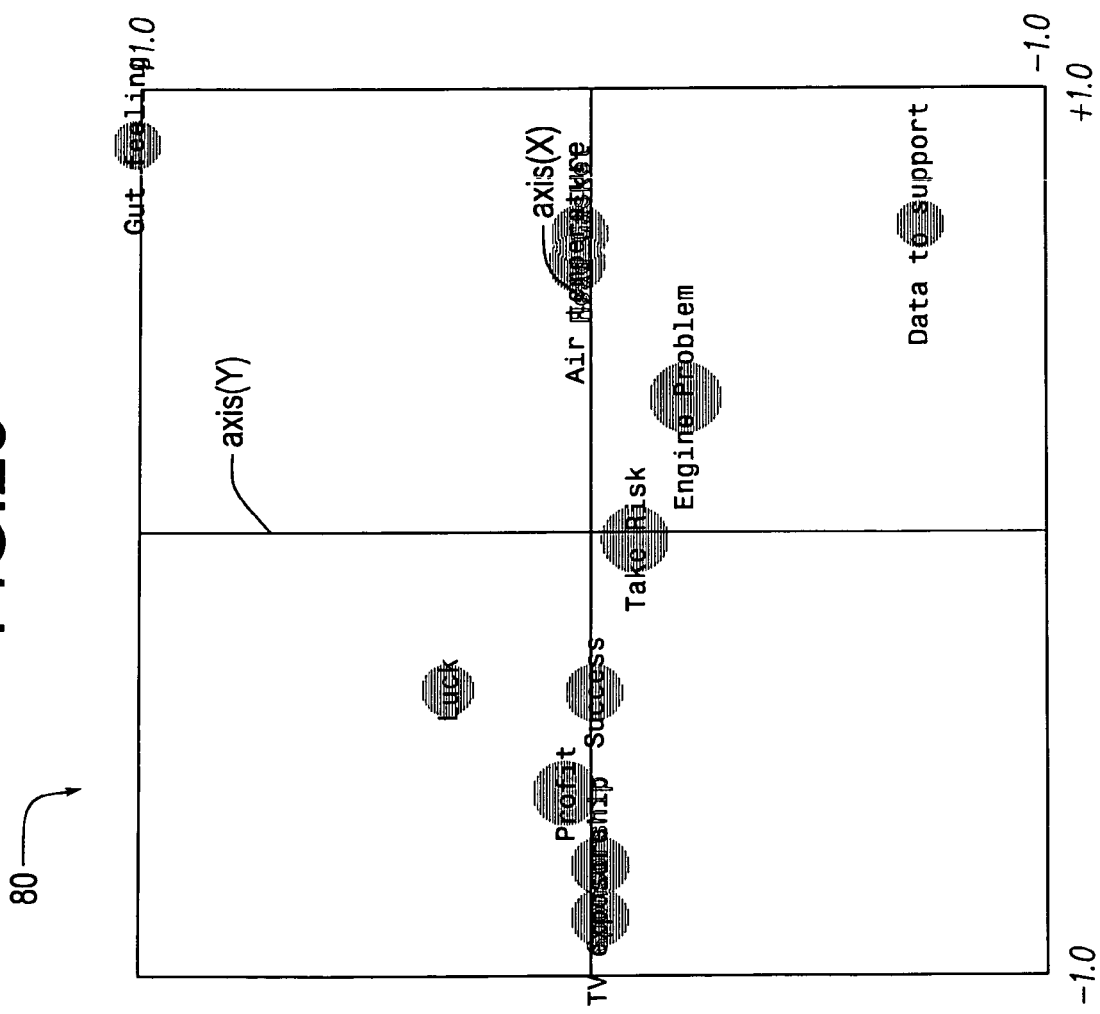

FIG. 26

| Item | Relative marginal frequency | axis #1 (X) | | | axis #2 (Y) | | | axis #3 (Z) | | | Cluster |
|---|---|---|---|---|---|---|---|---|---|---|---|
| | | Coordinate | Absolute contribution | Relative contribution | Coordinate | Absolute contribution | Relative contribution | Coordinate | Absolute contribution | Relative contribution | |
| TV Exposure/A | 0.043 | -0.901 | 0.091 | 0.834 | 0.023 | 0.000 | 0.001 | -0.099 | 0.005 | 0.010 | 1 |
| Profit/A | 0.054 | -0.667 | 0.062 | 0.853 | 0.037 | 0.001 | 0.003 | 0.105 | 0.006 | 0.021 | 1 |
| Engine problem/A | 0.065 | 0.227 | 0.009 | 0.251 | -0.206 | 0.023 | 0.206 | -0.127 | 0.011 | 0.078 | 2 |
| Sponsorship/A | 0.047 | -0.739 | 0.066 | 0.807 | -0.072 | 0.002 | 0.008 | -0.199 | 0.020 | 0.059 | 1 |
| Gut feeling/A | 0.029 | 1.189 | 0.105 | 0.511 | 0.947 | 0.211 | 0.324 | -0.584 | 0.103 | 0.123 | 2 |
| Data to support/A | 0.036 | 0.916 | 0.078 | 0.548 | -0.770 | 0.174 | 0.387 | 0.224 | 0.019 | 0.033 | 2 |
| Air temperature/A | 0.054 | 0.714 | 0.071 | 0.898 | 0.074 | 0.002 | 0.010 | 0.079 | 0.004 | 0.011 | 2 |
| Head Gasket/A | 0.054 | 0.721 | 0.073 | 0.900 | 0.071 | 0.002 | 0.009 | 0.084 | 0.004 | 0.012 | 2 |
| Luck/A | 0.036 | -0.432 | 0.017 | 0.162 | 0.372 | 0.041 | 0.120 | 0.736 | 0.205 | 0.470 | 1 |
| Success/A | 0.047 | -0.467 | 0.026 | 0.337 | -0.163 | 0.010 | 0.041 | -0.491 | 0.119 | 0.373 | 1 |
| Take Risk/A | 0.058 | -0.003 | 0.000 | 0.000 | -0.209 | 0.021 | 0.160 | 0.088 | 0.005 | 0.028 | 1 |
| TV Exposure/B | 0.036 | -0.901 | 0.076 | 0.669 | -0.173 | 0.009 | 0.025 | -0.442 | 0.074 | 0.161 | 1 |
| Profit/B | 0.054 | -0.582 | 0.047 | 0.722 | 0.133 | 0.008 | 0.037 | 0.160 | 0.015 | 0.055 | 1 |
| Engine problem/B | 0.054 | 0.439 | 0.027 | 0.558 | -0.288 | 0.037 | 0.240 | -0.168 | 0.016 | 0.081 | 2 |
| Sponsorship/B | 0.043 | -0.843 | 0.079 | 0.895 | -0.011 | 0.000 | 0.000 | -0.163 | 0.012 | 0.033 | 1 |
| Gut feeling/B | 0.033 | 0.659 | 0.036 | 0.274 | 0.994 | 0.261 | 0.625 | -0.181 | 0.011 | 0.021 | 2 |
| Data to support/B | 0.036 | 0.560 | 0.029 | 0.279 | -0.614 | 0.111 | 0.335 | 0.478 | 0.087 | 0.204 | 2 |
| Air temperature/B | 0.040 | 0.589 | 0.036 | 0.542 | -0.073 | 0.002 | 0.008 | -0.172 | 0.012 | 0.046 | 2 |
| Head Gasket/B | 0.036 | 0.734 | 0.050 | 0.589 | -0.093 | 0.003 | 0.009 | -0.105 | 0.004 | 0.012 | 2 |
| Luck/B | 0.036 | -0.315 | 0.009 | 0.082 | 0.526 | 0.081 | 0.228 | 0.835 | 0.264 | 0.575 | 1 |
| Success/B | 0.051 | -0.308 | 0.012 | 0.303 | 0.093 | 0.004 | 0.028 | -0.076 | 0.003 | 0.018 | 1 |
| Take Risk/B | 0.054 | -0.005 | 0.000 | 0.000 | 0.004 | 0.000 | 0.000 | 0.073 | 0.003 | 0.049 | 1 |

| | TV Exposure | Profit | Engine problem | Sponsorship | Gut feeling | Data to support | Air temperature | Head Gasket | Luck | Success | Take Risk |
|---|---|---|---|---|---|---|---|---|---|---|---|
| TV Exposure | 0 | 0 | -1 | 0 | 0 | 0 | 0 | 0 | 1 | 1 | 1 |
| Profit | 0 | 0 | 2 | 0 | 0 | 0 | -1 | -1 | 0 | 0 | 0 |
| Engine problem | -1 | 2 | 0 | 1 | 0 | 0 | 0 | 0 | 0 | 1 | 0 |
| Sponsorship | 0 | 0 | 1 | 0 | 0 | 0 | 0 | 0 | 0 | 0 | 0 |
| Gut feeling | 0 | 0 | 0 | 0 | 0 | 0 | 1 | 1 | -1 | -1 | -1 |
| Data to support | 0 | 0 | 0 | 0 | 0 | 0 | 1 | 1 | -1 | -1 | 0 |
| Air temperature | 0 | -1 | 0 | 0 | 1 | 1 | 0 | 1 | 1 | 0 | 1 |
| Head Gasket | 0 | -1 | 0 | 0 | 1 | 1 | 1 | 0 | 1 | 1 | 1 |
| Luck | 1 | 0 | 0 | 0 | -1 | -1 | 1 | 1 | 0 | -1 | 0 |
| Success | 1 | 0 | 1 | 0 | -1 | -1 | 0 | 1 | -1 | 0 | -1 |
| Take Risk | 1 | 0 | 0 | 0 | -1 | 0 | 1 | 1 | 0 | -1 | 0 |

METHOD AND APPARATUS FOR ANALYZING THOUGHT SYSTEM

BACKGROUND OF THE INVENTION

1. Field of the Invention

The present invention relates generally to a computer-based method and apparatus for analyzing a thought system of a subject which consists of at least one individual, based on various and ambiguous items perceived by the subject. More particularly, the present invention is concerned with techniques for retrieving or extracting at least one essential axis of thought system, i.e., at least one essential vector of dimension of the thought system, which is not observed even by the subject.

2. Description of the Related Art

As is apparent from many experimental rules and results of experiments, a human consciousness includes a multidimensional and complicated thought system. More specifically described, the human thoughts usually, e.g., in a daily life, relate to various kinds of matters or items such as tasks, friends, families, schools, hobbies, money, past matters, future matters, and the like. Moreover, each of these items, e.g., a task is also concerned with many items such as management, perspective, profit-making, and the like, which items are complicatedly related with one another. In general, the human is likely to recognize these items in an unorganized form, rather than in an organized form. Particularly, the human may recognize these items such that these items are not completely independent from one another, but relate with one another by any specific factors. However, the human generally does not or cannot recognize these specific factors.

Due to the above-mentioned ambiguous recognition of the relationship between the perceived items, the individual is prone to fail in appropriate organization of his or her idea upon deciding his or her way of performance, or upon arranging his or her thoughts. This drawback has been widely recognized by experiences. To overcome this drawback, these has been proposed to perform "Manual" method one of which will be described by way of example. Namely, an individual initially picks up items based on his or her perception, and then classifies these items into the appropriate number of groups in accordance with a predetermined standard such as an importance-basis standard, and a character-basis standard. Each of the obtained groups may further be classified or may be combined with another group or the other groups together, as needed, whereby the perceived items are organized into appropriate groups.

The "Manual" method as described above, however, requires the predetermined standard prepared by the individual or others, for prosecution of the classification of the items, so that a results of the method is inevitably affected by the predetermined standard and the classification executed based on the predetermined standard, resulting in insufficient consequent of the method. In particular, there is known that an individual may recognize only a part of his or her thought system, and that the individual's thought system further includes subconscious thoughts which are ambiguously noted or are never recognized by the individuals. Accordingly, the "Manual" method merely allow the individual to classify the recognized items into the appropriate groups. That is, the method is merely provided for arranging the superficially recognized items, resulting in obtaining an insufficient result of the method. Further, when the obtained perceived items have the relatively large number, while being complicatedly correlated with one another, the manual classification of the perceived items on the basis of the predetermined standard is extremely cumbersome and difficult. Thus, this "Manual" method does not work practically to analyze or arrange the items of the individual's thought system.

In recent years, there has been developed a multivariate analysis as one of statistical methods for clarifying scientific phenomenon in which a large number of elements are complicatedly correlated with each other, and the application of this multivariate analysis to various kinds of fields has been considered. One example of the application of this multivariate analysis is disclosed in U.S. Pat. No. 4,839,853, wherein the multivariate analysis is used to classify various kinds of documents. The classification of the documents such as books is extremely complicated and difficult, if the contents of the documents are in great variety, leading to a failure in the classification. Therefore, a singular value decomposition, a kind of the multivariate analysis, is performed to analyze the documents based on a data of relationship information between titles of documents and a set of words occurring in more than one title, to thereby obtain a positional data of each of the documents which represent the position of the document on a virtual space. Thus, the documents are displayed in the virtual space according to the obtained positional data, permitting visual recognition of the relationship between the documents, and permitting objective classification of the documents based on this visual recognition.

There has been considered to apply the above-described singular value decomposition to analyze the human thought system which is complicated as described above. However, the conventional singular value decomposition requires two kinds of sets of variables which are clearly distinguishable from each other, e.g., a set of document titles and a set of words occurring in more than one title, as in the above-indicated example. With the two mutually distinguishable set of variables, a matrix is generated so that the analysis is desirably performed on the generated matrix. However, the human thought system may includes perceived items which are ambiguously correlated with each other and are accordingly considered as variables belonging to a single group. Since the conventional singular value decomposition requires clearly distinguishable two kinds of groups of items as described above, the ambiguously-related items of the human thought system are not suitable for the conventional singular value decomposition and the application of the singular value decomposition on the analysis of the human thought system in impractical. Thus, the those skilled in the art would never motivate to apply the singular value decomposition to analyzing the human thought system.

SUMMARY OF THE INVENTION

It is therefore an object of this invention to provide a computer associated method and apparatus for analyzing a thought system of a particular subject consisting of at least one individual. The present method and apparatus for analyzing a thought system of a subject permit a computer analysis using a set of variables, i.e., a plurality of items perceived by the subject, without requiring a beforehand classification of the items on the basis of a predetermined standard, and are capable of retrieving or extracting an essential thought axis or axes, in other words, a principal component or components of the thought system of the subject, which has not been perceived even by the subject.

Extensive studies of the present inventor have been made to achieve the above-indicated object and reveal that an application of a novel scientific method for analyzing a plurality of items perceived by a particular subject permits an automatic extraction of an essential thought axis or axes of the subjects' thought system including whose subconscious. Namely, the application of the novel scientific method enables automatic-retrieval of an unknown essential thought axis or axes from superficially appeared items.

The above object may be achieved according to one aspect of the principle of the present invention, which provides a method of analyzing a thought system of a subject, the subject consisting of at least one individual, the method comprising the steps of: (a) obtaining a plurality of items perceived by the subject; (b) obtaining relationship information of all possible pairs of the items, based on perception of the subject with respect to relationship between two items of each of the all possible pairs of the items; (c) generating a relation matrix of the plurality of items based on the relation information of each of the items with respect to the all other items; (d) transforming the relation matrix to a display matrix projected on a representation space having dimensions lower than the number of the items and reflecting a relationship between the items perceived by the subject; and (e) displaying the items on the representation space according to the display matrix such that the items are plotted on the active positions in the representation space.

According to the method of analyzing the thought system of the subject according to the present invention, the obtained items perceived by the subject are never classified or grouped in the steps of (a) obtaining a plurality of items, (b) obtaining relationship information of all possible pair of items, and (c) generating a relation matrix of the plurality of items, and are dealt with variables in the same class or level, for generating the relation matrix. Further, the step (d) of transforming the relation matrix to the display matrix is arranged to perform a specific mathematical method on the relation matrix to thereby generating the display matrix which permits a display of the obtained perceived items on the representation space. It may be preferable that the step (d) of the analyzing method of the present invention is executed by using a capacity of high-speed arithmetic processing of a computer system to transform the relation matrix to the display matrix. It may be more preferably that the steps (c) and (e) is executed by suitable source of the computer system.

Accordingly, the analyzing method of the present invention can analyze the thought system of the subject, i.e., at least one individual, wherein a multiple items complicatedly correlated with each other, without requiring beforehand classification of the items based on a specific standard, e.g., concept of the items. Namely, the multiple items may be processed as a single band of information. Moreover, the analyzing method of the present invention requires only a plurality of items ambiguously and unsystematically perceived by the subject, and relationship information between each of the items and the all other items based on instinctive or subconscious judgement by the subject on the relationship between two items of each of the all possible item pairs, without using any specific standard for the judgement. This arrangement permits retrieval of an essential thought system of the subject, which is latent in a subconscious of the subject, and accordingly permits extraction of a frame of a thought system of the subject. Thus obtained plurality of items and relationship information thereof are used for generating the relation matrix. This relation matrix is transformed by statistical techniques into the display matrix projected on the representation space having relatively low dimensions, in which the items are plotted in the respective positions according to the display matrix. By observing the positions of the items or the like on the representation space, the subject can recognize at least one essential semantic axis of his or her thought system which has not been recognized even by the subject.

In the present invention, the subject may consist of a single individual or a group of a plurality of individuals or alternatively some groups of the plurality of individuals. Namely, the present analyzing method is capable of analyzing a thought system of one individual and a general thought system of the group. The present analyzing method may be arranged to analyze a relative difference between thought systems of the respective individuals of the group. Alternatively, the present analyzing method may be arranged such that the step of obtaining items may be performed in cooperation with the all individuals of the group, while the individuals may share the all possible pair of the items in the step of obtaining the relationship information. This arrangement may effectively facilitate the step of obtaining a multiple relationship information between two items of each of the all possible item pairs. In addition, the group of the plurality of individuals may be separated into sub-groups. In this case, the present analyzing method may be applicable for analyzing a difference between the respective thought systems of the sub-groups.

As for the multivariate items perceived by the subject, any item may be employed, provided the subject may recognize the item with somewhat awareness of the subject. For instance, various kinds of events or thoughts may be employed as items, irrespective whether the item is actual or abstract, or whether the item is conceptual or significant. Further, signals or drawings are also employed as the items. In view of the following analyzing processes, the items may preferably consist of words, phrases or sentences which represent the events or thoughts. The present analyzing method may preferably be arranged to show the individual the all items previously obtained upon the step of obtaining the items. This arrangement is effective to avoid multiple obtainment of the same item and to facilitate the process of obtaining the items by the subject.

In this respect, it may also be employable the items prepared by creation or selection by the subject. More specifically, the items prepared by the creation of the subject may comprise the items in the form of words or sentences, which are ambiguously recognized by the subject as a group of thoughts which seems to belong to the same thought system unsystematic style. On the other hand, the items prepared by the selection of the subject may comprise items in the form of words or sentences, which are selected by the subject from previously provided information in the form of sentences, upon making a decision on a particular subject based on the information of the sentences.

Since the items perceived by the subject may be employed as a multivariate in the present analyzing method, the step of obtaining the items may further be arranged to prompt the individual to obtain each item within preferably 50 seconds, more preferably, 30 seconds. This arrangement effectively prohibits the individual from obtaining the items based on his or her logically or consciously biased ideas, resulting in elimination of adverse influence on the result of the analysis due to the biased ideas. For obtaining the same effects, the present analyzing method may preferably be arranged such that the subject successively executes the steps of (a) obtaining a plurality of items and (b) obtaining relationship information of all possible item pairs in a substantially continuous time. Preferably, the step of (b) obtaining relationship information may be arranged to prompt the individual to obtain the relationship information of each item pair within 10 seconds, more preferably, 5 seconds. In addition, the number of the items obtained in the step of (a) obtaining relationship information is not particularly limited. However, the number of the items may preferably be within a range of 5-20, more preferably, 8-12, in view of that excessively small number of items provide difficulty to be analyzed by the present analyzing method, and that excessively large number of items leads to a tremendous increase of the number of the item pairs, like an increase according to a law of an exponential function, resulting in an excessive burden on the subject to evaluate all possible item pairs.

To avoid a relative judgement over the plurality of items, the step of (b) obtaining relationship information is arranged to show the subject only two items of each of the all-possible item pairs, upon obtaining the relationship information between the items. In other words, the step (b) is arranged to avoid showing the subject three or more items at a time. Preferably, the present analyzing method may further comprise the steps of: detecting a unique item having no relationship to the all other items based on the relationship information; and deleting the unique item from the obtained items so as to regenerate the relation matrix obtained in the step of (c) generating the relation matrix. This arrangement effectively eliminates or reduces an adverse influence of the unique item on the result of the present analysis. The unique item may comprises a unique item which has no relation with the all other items, and a sub-unique items which has few relation with the all other items. When deletion of both of the unique and sub-unique items is required, the analyzing method may be arranged such that the unique items are absolutely deleted, while the sub-unique items are optionally deleted with the subject's approval of deleting thereof. In this respect, the sub-unique items may be shown to the subject for judging whether the sub-unique items should be deleted. It should be understood that the deletion of any one of the unique and sub-unique items requires regeneration of the relation matrix. In some cases, the unique and sub-unique items may occur in a relatively high frequency, due to the inherent problem of the obtained items. For the such cases, the present analyzing method may preferably include an option to return to the step of (a) obtaining a plurality of items to recommence the steps of analyzing method according to the present invention.

Preferably, the analyzing method of the present invention may further comprise the steps of judging the relationship information is biased, and displaying a warning to the subject if the relation ship information is biased. Further, the analyzing method optionally comprises the step of initializing the step of obtaining the relationship information if the relationship information is biased, so as to recommence the step of obtaining the relationship information, as needed. It is considered that the relationship information may be biased due to that the subject's criterion for judging the relationship between two items of each item pair. In view of this, the present analyzing method may preferably be arranged to optionally prompt the subject to recommence the step of obtaining the relationship information, in other word, to amend his or her criterion for judging the relationship between two items of each item pair. In some cases, the relationship information may be biased due to the order of showing the item pairs and accordingly may possibly normalized later. In view of this, the present analyzing method may preferably include the step of allowing the subject to determine whether it is required to recommence the step of (b) obtaining the relationship information.

In the present analyzing method, the relationship information may be obtained in a variety of different forms, provided the information ambiguously represents the relationship between each item and the all other items. Preferably, the relationship information may consist rating of relationship (hereinafter, referred to as a "relation rating") between two items of each of the all-possible item pairs. For effectively extracting an essential part or frames of the thought system of the subject, the relation information may preferably consist of conceptional rating values such as, "large", "medium" and "small", so as to avoid the obtained relation ratings being affected by logical ideas of the subject. The relation rating for represent the relationship between two items of each item pair may preferably includes 2-5 levels, more preferably 3 levels. For instance, the relationship information may include 5 levels literally represented by "very strong relation", "strong relation", "some relation", "few relation" and "almost no relation". Thus obtained literal relation information may preferably be converted into numerical values so as to be processed as a quantitative data in the following statistical process, for facilitating the statistical process.

In the present analyzing method, the items perceived by the subject and obtained in the step of (a) may preferably be a qualitative data, while the relation information obtained in the step of (b) may preferably be a quantitative data. In this respect, the qualitative data is a qualitative analysis data that represent a property or contents of the item by using characters or words having no concept of numerical values. On the other hand, the quantitative data is a quantitative analysis data that represent a property of the item by numeral or numerical values.

According to the present analyzing method, the step of (b) obtaining relationship information further comprising the step of showing the subject only one pair of the all possible pairs of the items in order, so that the individual can assign the relation information for each item pair, in the same order. Moreover, the order of showing the subject the one pair of the all-possible item pairs is arranged to avoid repetition of the items in consecutive pairs. This arrangement permits the subject to judge relationship between only two items, irrespective of relativity to the all other items, while prohibiting relative and logical judgement on the three or more items. It is accordingly avoided that the result of the analysis merely reveal a superficial thought system due to the above-mentioned relative or logical judgement, resulting in effective extraction of a desired essential part of the thought system of the subject. For obtaining the relationship information between two items of each of the all-possible pairs, a graphical user interface may be suitably employed. The graphical user interface according to the present invention includes a variety of different display formats. For instance, the items may be arranged for a upper side and a lower side or a right side and a left side of the user interface. In the user interface of the present invention, the order of displaying items may preferably be arranged so as to avoid repetition of the same items in consecutive pairs. In addition, the order of displaying items may preferably be arranged such that each item alternatively appears on the opposite sides of the display. For instance, the item which currently appears on one side of the display is arranged to appear on the other side of the display in the next occasion which comes after the several item pairs are evaluated.

According to the present analyzing method, the step of (c) generating a relation matrix of the plurality of items is effectively generated by using the relationship information about relationship between each item with the all other items, as elements of the relation matrix. That is, the relation matrix is a square matrix in which valuations both in rows and columns consist of obtained items perceived by the subject. In this square matrix, the row items and the column items are accordingly the same, so that the square matrix represents character of each item, in other words, relativity of each item with respect to the all other items.

Moreover, the present analyzing method may further comprises the steps of (f) generating a profile matrix by dividing each element of the relation matrix by a sum of the elements of the relationship matrix, and (g) generating a transformed matrix by transforming the profile matrix based on deviation of each element of the profile matrix from the corresponding expectation of the each element of the profile matrix. These steps of generating the profile matrix and the transformed matrix may be performed before executing the step of (d) transforming the relation matrix to the display matrix. These pre-treatments performed on the relation matrix enable to provide an improved relation matrix which effectively clarify a position of each item in the entire thought system of the subject, based on the relationship information between each item and the all other items. Therefore, the relation matrix processed by the pre-treatments is effectively transformed into the display matrix projected in the representation space.

In the present analyzing method, the step of (d) transforming the relation matrix to the display matrix preferably comprises a step of performing a singular value decomposition (S.V.D). As discussed above, the relation matrix of the present analyzing method is generated in the form of a square matrix, so that a technique of eigenvalue problem, which is recognized as a special case of S.V.D, may also be applicable for processing the display matrix. With aid of the statistical techniques, such as the S.V.D, for decreasing dimensions of the matrix, the relation matrix, in particular, the relation matrix processed by the pre-treatments can effectively be transformed into the display matrix which is projected on the representation space having dimensional axis as a characteristic semantic axis of the thought system.

In addition, the step of (d) transforming the relation matrix to a display matrix may preferably comprises a step of modifying the display matrix such that values of elements of the display matrix to be weighted with respect to each dimension. This arrangement which is performed after obtaining the display matrix permits to provide an improved display of positional relationship between the all items, so that the subject can easily recognize the relationship between the items, facilitating recognition of essential dimension axes of the thought system of the subject.

In the step of (e) displaying the items on the representation space according to the display matrix, there is employed a variety of different display formats, such as a list of data including numerical values representing positions of the items on the representation space. Preferably, a graphical format of a two- or three-dimensional coordinate may be employed wherein each item is plotted in the corresponding coordinates. This graphical format according to the present analyzing method ensures an easier visual recognition of the essential axes of the thought system of the subject, in comparison with the display format which merely shows a numerical data representing the positions of the respective items. Upon displaying the all items on the two- or three-dimensional coordinate, the each item may preferably be plotted with a circular object whose radius varies based on the corresponding value of relativity thereof with respect to the all other items. Alternatively, the radius of the circular object representing the item may vary based on the value of relativity thereof with respect to any dimensional axis of the thought system. These graphical display format arranged according to the present analyzing method as described above, permits visually displaying the result of the present analysis with additional information as needed, further facilitating recognition of the essential axis or axes of thought system of the subject.

Further, according to the present analyzing method, the step of (d) transforming the relation matrix to the display matrix further comprises the step of storing a data of the display matrix. This arrangement makes it possible to display the all items on the respective positions of the representation space according to the stored display matrix, in a variety of desired display format, at any time.

Moreover, the analyzing method of the present invention preferably comprises a step of performing a cluster analysis using the display matrix, so as to separate the items into groups the number of which is smaller than the total number of the items. By performing the cluster analysis using the display matrix, the items plotted on the respective positions of the representation space are separated into the suitable number of groups, still further facilitating recognition or analysis of the thought system. As for the method of cluster analysis, there may be employed various kinds of method known in the art, such as a nearest-neighbor method, a furthest-neighbor method, a group-average method, a k-means method, or the like. When the cluster analyzing method is employed in the step of (d) transforming the relation matrix to the display matrix, the present analyzing method may further be arranged to display the items on the representation space with different colors which varies depending on number of groups in the step of (e) displaying the items. That is, the items belong to the identical group are displayed with the same color assigned to the group. This arrangement may further facilitate the recognition and analysis of the thought system.

In addition, the present analyzing method may be usable for analyzing the though system of the subject which consists of a plurality of individuals. In this case, the present analyzing method may be arranged to perform the step of analyzing method of the present invention by the plurality of individuals together, i.e., by the subject, so as to analyze the thought system of the subject. Alternatively, the present analyzing method may be arranged to perform some of the steps by each of the plurality of individuals and integrate the result of the steps obtained by each individual to provide the integrated result of the steps. This integrated result of the steps is further processed according to the present analyzing method so as to analyze the thought system of the subject. More specifically described, the plurality of individuals who constitute the subject, are cooperate together to execute the step of (a) obtaining a plurality of items as items perceived by the subject. The following step of (b) obtaining relationship information is separately executed by each of the plurality of individuals so as to obtain a plurality of set of relationship information between each item and the other all items. The successive step of (c) generating a relation matrix of the plurality of items is arranged to integrate the plurality of relationship information together, to thereby generate a relation matrix for the subject consisting of the plurality of individuals. The obtained relation matrix is processed by the specific statistical method, for analyzing the entire though system of the plurality of individuals, i.e., the subject. Alternatively, the step of (b) obtaining relation information may be arranged such that the plurality of individuals share the all-possible item pairs for judging relationship between two items of each of the all-possible item pairs for obtaining the relationship information between two items of the all possible item pairs, effectively reducing a burden for each of the individuals for judging the relationship information of the all possible pairs. This arrangement is effective in particular for processing a multiplicity of items which causes a tremendous increase of the number of the item pairs, like an increase according to a law of an exponential function.

Further, the present analyzing method may also be applicable to analyze the difference in thought systems between the plurality of individuals who constitute the single subject, or may be applicable to analyze the difference in thought systems between the plurality of subject. Specifically, in the former case, a plurality of items are obtained according to the present analyzing method, initially. The following step of (b) obtaining relationship information is separately executed by each of the plurality of individuals so as to obtain a plurality of set of relationship information between each item and the other all items. The successive step of (c) generating a relation matrix of the plurality of items is arranged to generating a plurality of relation matrixes for the respective individuals, so as to generate a juxtaposition relation matrix wherein the plurality of relation matrixes are juxtaposed. The obtained juxtaposition relation matrix is processed in the steps of (d) transforming the relation matrix to respective display matrix and (e) displaying the items on the representation space according to the display matrixes, according to the present analyzing method transforming the relation matrix. Accordingly, the plurality of thought systems of the respective individuals can be projected on the same representation space, so that the difference between the individuals in perception with respect to the same item can be effectively displayed and visually recognized. When the subject consists of a plurality of groups each including a plurality of individuals, the above-mentioned analyzing method according to the present invention may also be applicable, provided each group is recognized as an individual.

Further, the analyzing method of the present invention may be arranged to perform the step of the analyzing method of the present invention as described above, in multistage. Namely, the present analyzing method of multistage may comprises, for example, (h) a first stage comprising of the step of performing the present analyzing method as described above on the thought system of the subject, and (i) a second stage comprising the steps of: selecting at least one of the items obtained in the first step; obtaining a plurality of items perceived by the subject with respect to the selected item; and analyzing the obtained plurality of items according to the present analyzing method as described above.

The above object of the present invention may be achieved according to another aspect of the principle of the present invention, which provides an apparatus of analyzing a thought system of a subject, the subject consisting of at least one individuals, comprising: (j) a first input device being arranged to input a plurality of items perceived by the subject; (k) a second input device being arranged to input relationship information between two items of each of all possible pairs of the plurality of items, based on perception of the subject with respect to the relationship between the two items; (l) a relation matrix generator adapted to generate a relation matrix based on the relationship information of each of the items with respect to the all other items; (m) a display matrix generator adapted to transform the relation matrix into the display matrix projected on a representation space having dimensions lower than the number of the items, the representation space reflecting a relationship between the items perceived by the subject; and (n) a display device adapted to display the items in the representation space such that the items are plotted on respective positions in the representation according to the display matrix.

The analyzing apparatus of the thought system of the subject according to the present invention is suitably arranged for executing the analyzing method of the present invention aforementioned, exhibiting technical effects and advantages of the present invention effectively. It is appreciated that the analyzing apparatus of the present invention may preferably be embodied with an association of a computer system. In one preferred form of the present apparatus, the first and second input devices are arranged to be operable for inputting the items and relationship information, at the same time upon obtaining these items and relationship information from the subject. Alternatively the first and second input devices are arranged to be operable for inputting the items and relationship information after obtaining these items and relationship information from the subject. The display device used in the present analyzing apparatus may not be specifically limited, but may preferably be comprised with an visual display device which is capable of displaying a graphical display format wherein the all items are plotted on two- or three dimensional coordinate. Such a display device is able to aid the subject to recognize the positions of the all items on the representation space, facilitating recognition of the essential dimensional axis or axes of the thought system of the subject. The second input device of the present invention which is adapted to input relationship information between two items of each of all possible item pairs, may preferably be constituted by a plurality of terminal units connected to the analyzing apparatus via a communication network, so as to allow the individual to input the relationship information by the terminal unit. The analyzing apparatus having the plurality of terminal unit allows the subject consisting of the plurality of individuals to input the required information, e.g., the items or the relationship information by using the terminal units. This arrangement may facilitate and improve efficiency of the operation of the thought-system analysis of the present invention, for example, when the relationship information should be obtained separately from each individual of the subject, or when the plurality of individuals of the subject share the all possible item pairs for judging relationship between two items of each item pair, in order to reduce the number of item pairs assigned to each individual.

It is a yet another aspect of the principle of the present invention, which provides a computer program product for analyzing a thought system of a subject by using a plurality of items perceived by the subject that consists of at least on individual. The computer program product comprising: computer code that relates each of the items to all other items, using a rating of relationship on several levels; computer code that generate a relation matrix using the obtained relation ratings; computer code that performs a multivariate analysis on the relation matrix so as to transform the relation matrix to a display matrix; computer code that display the all items on respective position of a representation space according to the display matrix; and a computer-readable medium that stores the program codes.

The computer program product of the present invention may preferably comprise computer code that performs a cluster analysis using the display matrix, or other computer codes for performing any one or more of other steps of analyzing method according to the present invention. It is appreciated that the computer-readable medium may preferably be selected from a floppy disk, a magnetic tape, an optical disk, a magnet-optical disk, a computer hard disk, a flash memory and the like.

It is still another aspect of the present invention to provide a computer program data signal for analyzing a thought system of a subject consisting of at least one individual, the computer program data signal embodied in a telecommunication medium and representing sequences of instructions which, when executed by a processor, cause the processor to perform the steps of: (a) obtaining a plurality of items perceived by the subject; (b) obtaining relationship information of all possible pairs of the items, based on perception of the subject with respect to relationship between two items of each of the all possible pairs of the items; (c) generating a relation matrix of the plurality of items based on the relation information of each of the items with respect to the all other items; (d) transforming the relation matrix to a display matrix projected on a representation space having dimensions lower than the number of the items and reflecting a relationship between the items perceived by the subject; and (e) displaying the items on the representation space according to the display matrix such that the items are plotted on respective positions in the representation space.

The computer program data signal embodied in the telecommunication medium of the present invention makes it possible to easily provide an analyzing apparatus according to the present invention in association with a computer system, by only transmitting the computer program data into the computer system via the telecommunication channel. The computer program data signal may further include signals for performing any one or more of other steps of the analyzing method according to the invention. It is appreciated that the telecommunication medium may preferably be selected from any one of various kinds of medium which is capable of transmitting the computer program data signal. For instance, an optical cable, a radio, a cable, or the like which are available in the form of network may be employed. Further, the telecommunication channel may include both of the medium which utilizes a carrier wave for transmitting the computer program data signal and the medium which utilizes no carrier wave for transmitting the computer program data signal.

BRIEF DESCRIPTION OF THE DRAWINGS

The above and optional objects, features, advantages and industrial technical significance of this invention will further clarified by reading the following detailed description of presently preferred embodiments or forms of the invention, by reference to the accompanying drawings, in which:

FIG. 7(a) is a diagrammatic representation of one example of a sequence control matrix according to the first embodiment, and FIGS. 7(b) and 7(c) are diagrammatic representation of matrixes used for arranging the sequence control matrix;

FIG. 8 is a view showing another example of a user interface according to the first embodiment, which is arranged to obtain relation rating between two items of each of the all possible pairs of the items;

FIG. 16 is a diagrammatic representation of one example of a relation matrix of the items as shown in FIG. 15, according to the second embodiment of the present invention;

FIG. 17 is a diagrammatic representation of one example of a display matrix according to the second embodiment of the present invention, which is obtained by transforming the relation matrix of FIG. 16 by performing a singular value decomposition.

FIG. 20 is a view illustrating yet another example of the graphical display format according to the second embodiment of the present invention, corresponding to FIG. 18;

FIG. 21 is a view illustrating still another example of the graphical display format according to the second embodiment of the present invention, corresponding to FIG. 18;

FIG. 22 is a diagrammatic representation of one example of a relation matrix according to a third embodiment of the present invention, which is generated based on two sets of relation ratings with respect to the same items, which are obtained from two individuals;

FIG. 23 is a diagrammatic representation of a aggregated form of the relation matrix of FIG. 22, which is arranged to represent an integral result of the two individuals;

FIG. 24 is a diagrammatic representation of one example of a display matrix according to the third embodiment of the present invention, which is obtained by transforming the relation matrix of FIG. 23 by performing a singular value decomposition FIG. 25 is a view illustrating one example of a graphical display format according to the third embodiment of the present invention, wherein items are plotted on the two dimensional coordinate based on the display matrix of FIG. 24.

FIG. 26 is a diagrammatic representation of another example of the display matrix according to the third embodiment, which is transformed from the relation matrix of FIG. 22, by performing a singular value decomposition;

FIG. 28 is a diagrammatic representation of a difference matrix representing difference in perception between two individuals regarding each item, obtained from the relation matrix of FIG. 22.

DETAILED DESCRIPTION OF THE EMBODIMENTS

Figure 1:
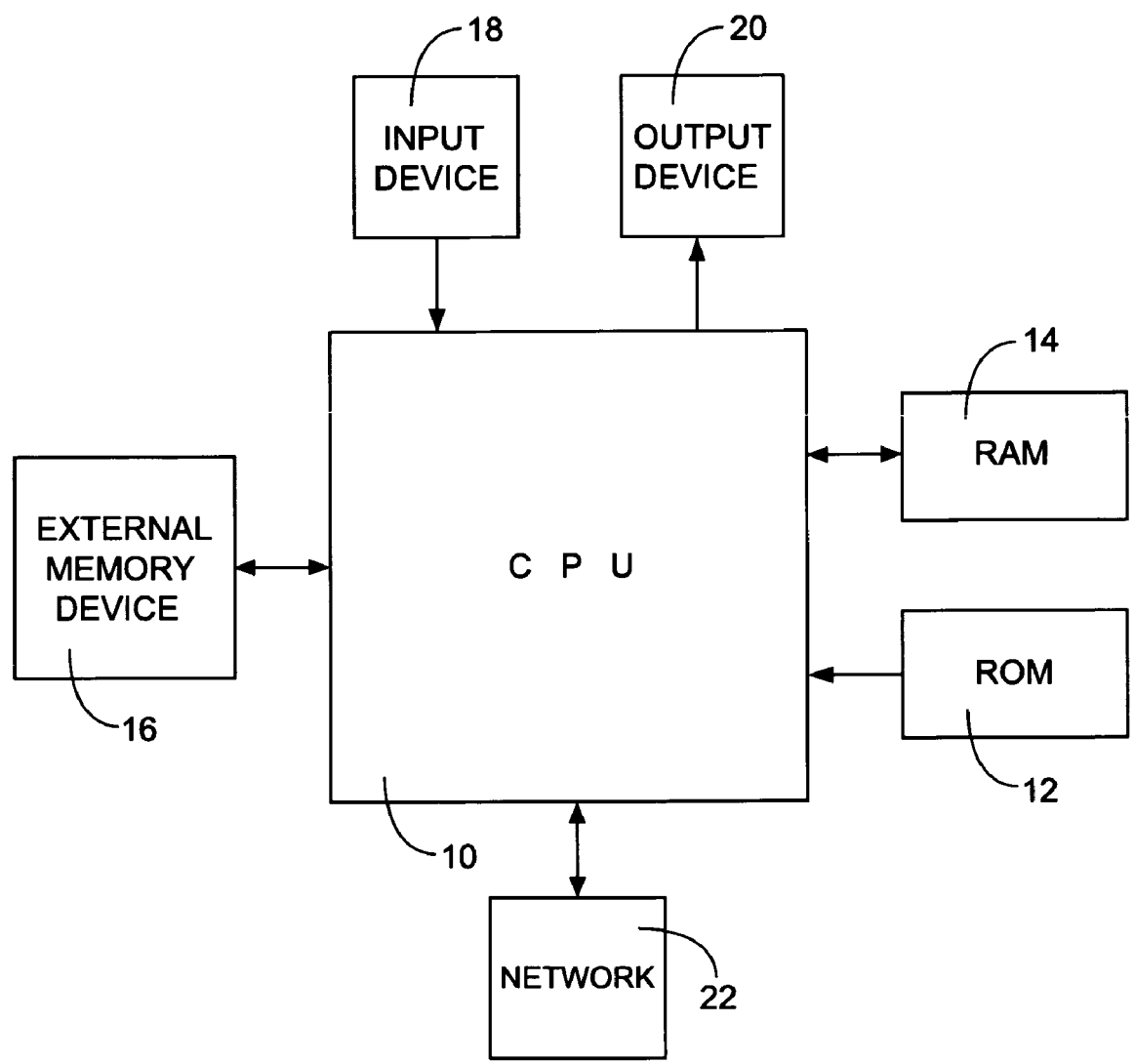
FIG. 1 is a block diagram depicting a structure of hardware in an analyzing apparatus constructed according to a first preferred embodiment of the present invention.

Referring first to FIG. 1, there is schematically shown a structure of hardware in a thought-system analyzing apparatus constructed according to a first embodiment of the present invention. As is apparent FIG. 1, the hardware structure of the analyzing apparatus of the present embodiment may be suitably embodied by an ordinal computer system such as a personal computer commercially available. More specifically described, the computer system incorporates a CPU 10 as a central processing unit, a ROM 12 in the form of a read-only memory, a RAM 14 in the form of a random-access memory, and an external memory device 16 such as a floppy disk, a hard disk, an optical disk, a magnet-optical disk, and magnetic and paper tape recorders. To the CPU 10, there are connected input devices 18 such as mice and keyboards and output devices 20 such as display devices and printers. The CPU 10 is adapted to process signals which are inputted through the input device 18, and a data stored in the external memory device 16, according to control programs stored in the ROM 12, while utilizing temporary memory function of the RAM 14, so as to output various kinds of signals such as control signals and display signals. The computer system of the present embodiment may optionally be coupled to a computer or a telecommunications network 22 via a telecommunication channel so that the computer system can transmit to and receive from the network 22 a computer data signal.

Figure 2:
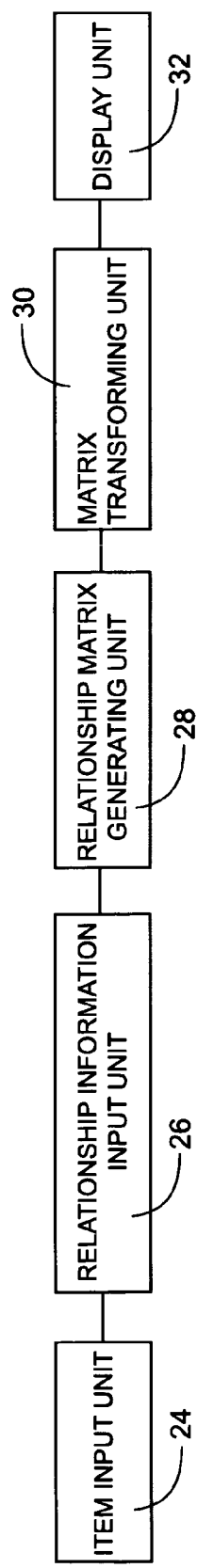
FIG. 2 is a block diagram schematically showing functional features of the analyzing apparatus of FIG. 1.

Referring next to FIG. 2, there is shown a block diagram schematically representing functions of the analyzing apparatus according to the present embodiment. The analyzing apparatus of the present embodiment is adapted to analyze multivariate items perceived by a particular subject, e.g., an individual in the present embodiment, and functionally incorporates an item input unit 24 as a first input means for inputting perceived items, a relationship information input unit 26 as a second input means for inputting relationship information between two items of each of all possible pair of the items, a relation matrix generating unit 28 as a relation matrix generator, a matrix transforming part 30 as a display matrix generator, and a display unit 32 as a display device.

The item input unit 24 is adapted to allow the individual to input into the computer system the multivariate items (words and phrases in the present embodiment) perceived by him or her as a multivariate items. The item input unit 24 may suitably comprises at least one of keyboards, voice input devices, pointing devices, touch-sensitive displays, handwriting recognizers, as well as other well known input devices. The item input unit 24 enables the individual to input his or her noted items into the computer system, or enables the third person to input the items perceived by the individual into the computer system.

The relation rating input unit 26 is adapted to allow the individual to input his or her perceptions of relationship between two items of each of the all possible pairs of the inputted items. In the present embodiment, the relationship information is a quantitative data consisting of relation rating on three levels. The relationship information input unit 26 may suitably comprises at least one keyboards, mice usable with a suitably arranged graphic user interface (GUI), a suitably arranged touch-sensitive displays, and the like, thereby permitting input of the quantitative data. Like the item input unit 24, the relationship information input unit 26 enables the individual to input his or her perception of relationship between the items into the computer system, or enables the other person to input the relationship information predetermined by the individual into the computer system.

The relation matrix generating unit 28 is adapted to generate a relation matrix based on the relationship information obtained in the relationship information input unit 26. The generated relation matrix is capable of representing how the individual perceives each item with respect to all other items. In general, the relation matrix may be obtained in the form of a symmetric (square) matrix, except when the subject of the analysis consists of a plurality of individuals (as in a third embodiment described later) wherein the relation matrix includes a plurality of sub-relation matrixes juxtaposed therein. The sub-relation matrixes are obtained by a plurality of individuals, respectively, in the third embodiment.

The matrix transforming unit 30 is adapted to transform the relation matrix generated in the relation matrix generating unit 28 into a display matrix representing a representation space wherein the items are relatively positioned for reflecting the individual perception of relativity of all the items. More specifically, display space includes at least one essential dimension axis of the thought system of the individual, which is extracted from the items, so that the items may be plotted on the respective positions with respect to the extracted dimension axis. Since the relation matrix has a large number of character dimensions, i.e., a higher-dimension matrix, a decrease of the number of dimensions is required to permit a projection of the relation matrix on a low-dimension representation space, preferably, a three-dimension representation space. To this end, a singular value decomposition is effectively employed.

More specifically described, the relation matrix generating unit 28 is executed to generate a relation matrix X having I rows and J columns, for example. This relation matrix X is processed to obtain a profile matrix P, according to the following equation (1), wherein each element $x_{ij}$ of the relation matrix X is divided by the ground total N thereof:

$$p_{ij} = x_{ij}/N \quad (1)$$

where, $$N = \sum_{i=1}^{I} \sum_{j=1}^{J} x_{ij}$$

Subsequently, each element $p_{ij}$ of the profile matrix P is processed by a specific statistical method similar to chi-square as defined by the following equation (2), thereby obtaining a transformed matrix A wherein each element $a_{ij}$ is obtained by transforming the corresponding element $p_{ij}$ of the profile matrix P based on its degree of deviation with respect to its expectation:

$$a_{ij} = (p_{ij} - r_i c_j)/r_i c_j \quad (2)$$

where, $$r_i = R_i/N$$

$$c_j = C_j/N$$

$$R_i = \sum_{j=1}^{J} x_{ij} \quad C_j = \sum_{i=1}^{I} x_{ij}$$

The obtained transformed matrix A is then decomposed, with a singular value decomposition (SVD) or a similar method. By way of example, a transformed matrix A having I rows and J columns, may be decomposed by the SVD according to the following equation (3):

$$A = UDV^T \quad (3)$$

where,
U: matrix of I rows and k columns,
D: diagonal matrix of k rows and k columns,
V: matrix of J rows and k columns,
index T: transformed matrix.

With respect to the above-indicated equation (3), the following equation (4) is satisfied, when the matrix U includes vectors ($u_1, u_2, u_3 \ldots u_k$) and the matrix V includes vectors ($v_1, v_2, v_3 \ldots v_k$), while the matrix D includes diagonal elements ($d_{11}, d_{22}, d_{33} \ldots d_{kk}$) which satisfy the following inequality: $d_1 \geq d_2 \geq d_3 \geq \ldots \geq d_k$:

$$A = d_1 Q_1 + d_2 Q_2 + d_3 Q_3 + \ldots + d_k Q_k \quad (4)$$

where, $$Q_s = u_s v_s^T$$

(s is integer of 1-k)

In this respect, the diagonal elements of the matrix D is desirably and easily arranged to satisfy the following inequality: $d_1 \geq d_2 \geq d_3 \ldots \geq d_k > 0$.

As is apparent from the above-indicated equations, the matrix A may be represented by a liner sum of the matrix Q, such that the characteristics of the matrix A may be clearly shown by some of singular vectors having relatively larger singular value. Therefore, selection of a suitable number of singular vectors having large singular values permits effective generation of a display matrixes U*, V* whose number of dimensions is lower than that of the relation matrix.

Thus obtained display matrixes U*, V* may further be processed to relatively weight the elements with respect to each dimension as needed. More specifically, the display matrixes U*, V* having a suitable number of dimensions may be multiplied by an appropriate matrix which is suitably weighted with respect to each dimensions, thereby obtaining the display matrixes U*, V* desirably weighted. For weighting the elements, a singular value corresponding to each dimension is suitably employed.

Next, the display unit 32 is adapted to display each of the items in a corresponding position of the representation space, based on the display matrixes U*, V*, whereby the representation space reflects the individual's perception of relationship between the all items. The representation space may be displayed in a variety of different forms or formats. For instance the representation space may be indicated by numerical values representing coordinates of respective items in a coordinate plane or alternatively be displayed in a graphical format arranged to visually show a coordinate representing the thought space wherein each of the items is plotted on the corresponding position with a circular object, and the like. It should be appreciated that the items may generally be represented in a variety of different forms. In the display unit 32, there are suitably employed a printer and/or a display device as a display device.

Figure 3:
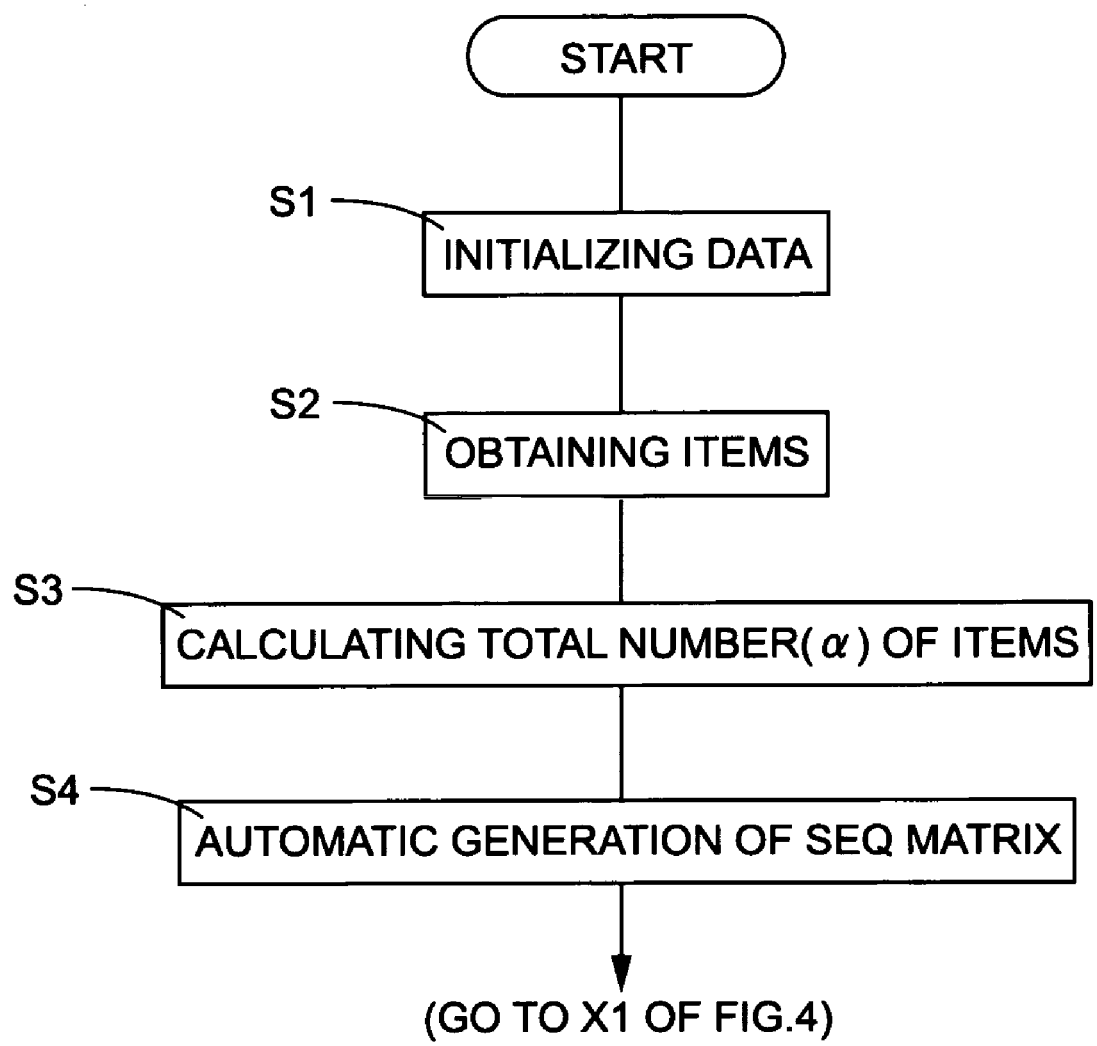
FIG. 3 is a flow chart illustrating a routine for obtaining items perceived by an individual executed by the analyzing apparatus of FIG. 1.
Figure 4:
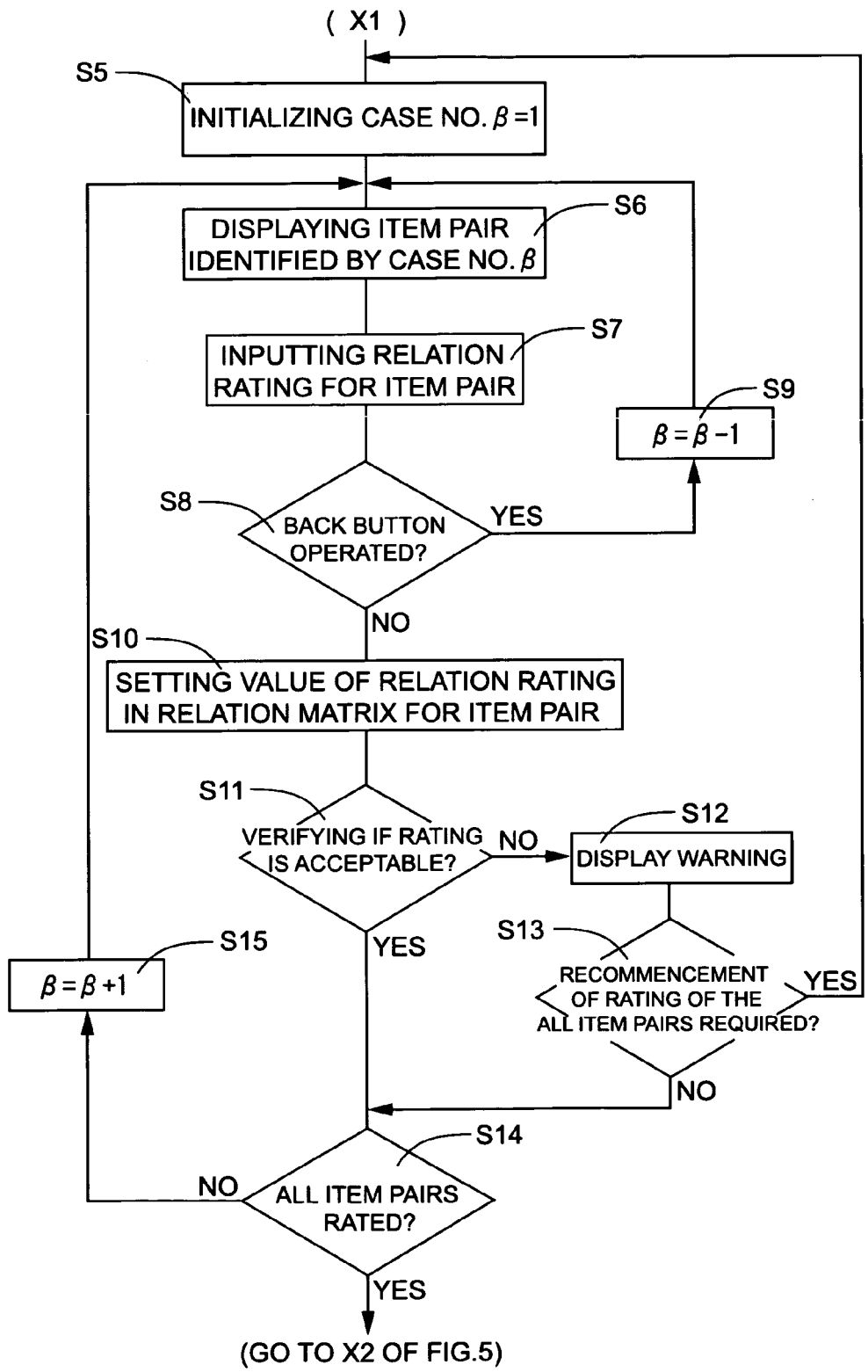
FIG. 4 is a flow chart illustrating a routine successive to the routine of FIG. 3, for obtaining relation ratings of all possible pairs of the items.
Figure 5:
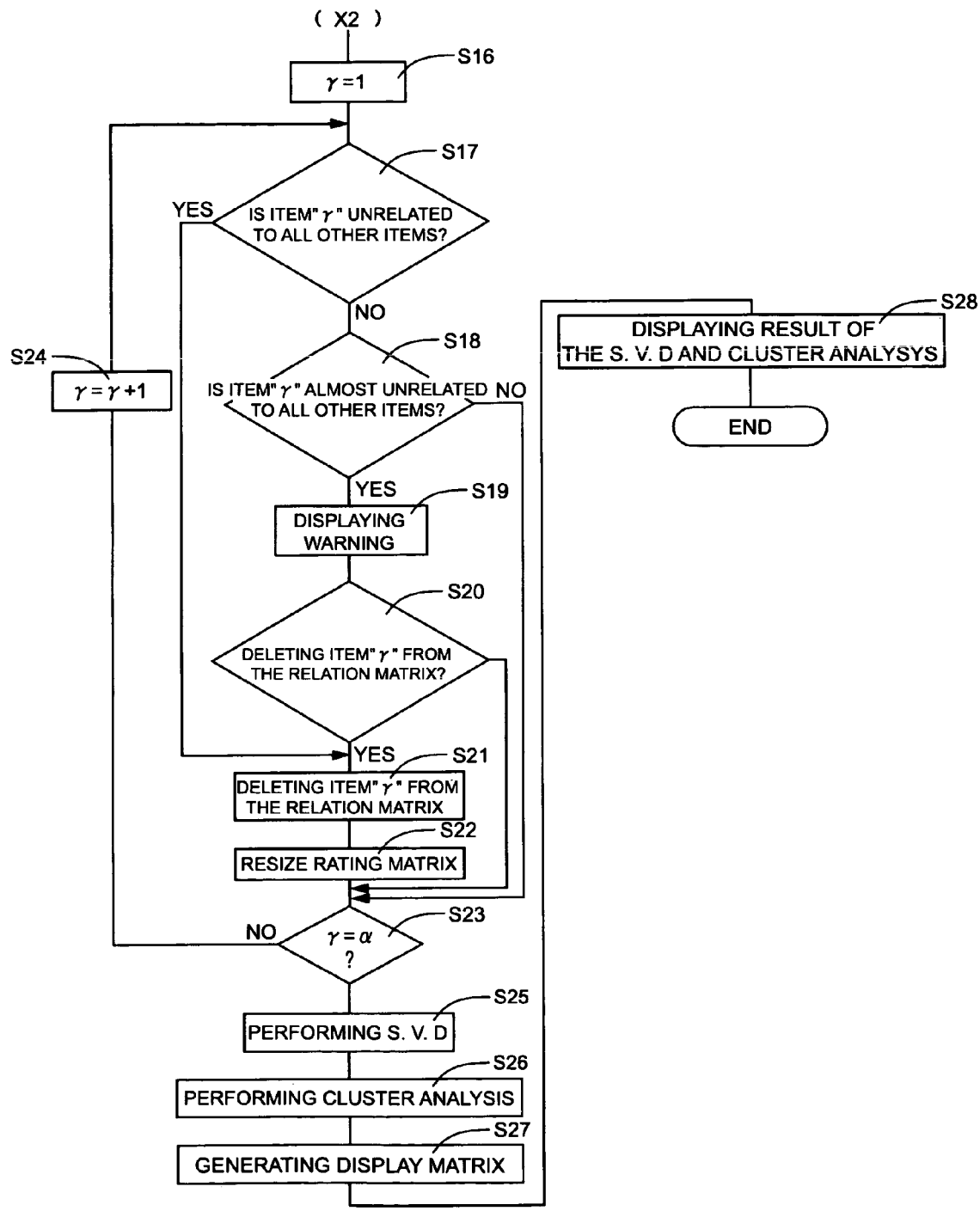
FIG. 5 is a flow chart illustrating a routine successive to the routine of FIG. 4, for performing a multivariate analysis.

Referring next to FIGS. 3-5, there will be described in detail a series of routines executed by the analyzing apparatus i.e., the computer system constructed according to the present embodiment, as illustrated in FIGS. 1 and 2 for analyzing a multivariate data perceived by the subject, e.g., perceptions of a present inventor in the present embodiment as a matters and/or events which are likely to relate with his work. In the present embodiment, the computer system is operated by the subject. In the following description, for illustrative purpose only, the present inventor operates the computer system by himself for analyzing his thought system.

The item obtaining routine of FIG. 3 will be first described. The routine is started with step S1 in which all data are initialized. Step 1 is followed by Step 2 to allow the individual, in this case the present inventor himself, to input a predetermined number of items successively. In the present embodiment, the items may consist of items perceived by the inventor as the matters and/or events which appear to relate to his tasks.

Figure 6:
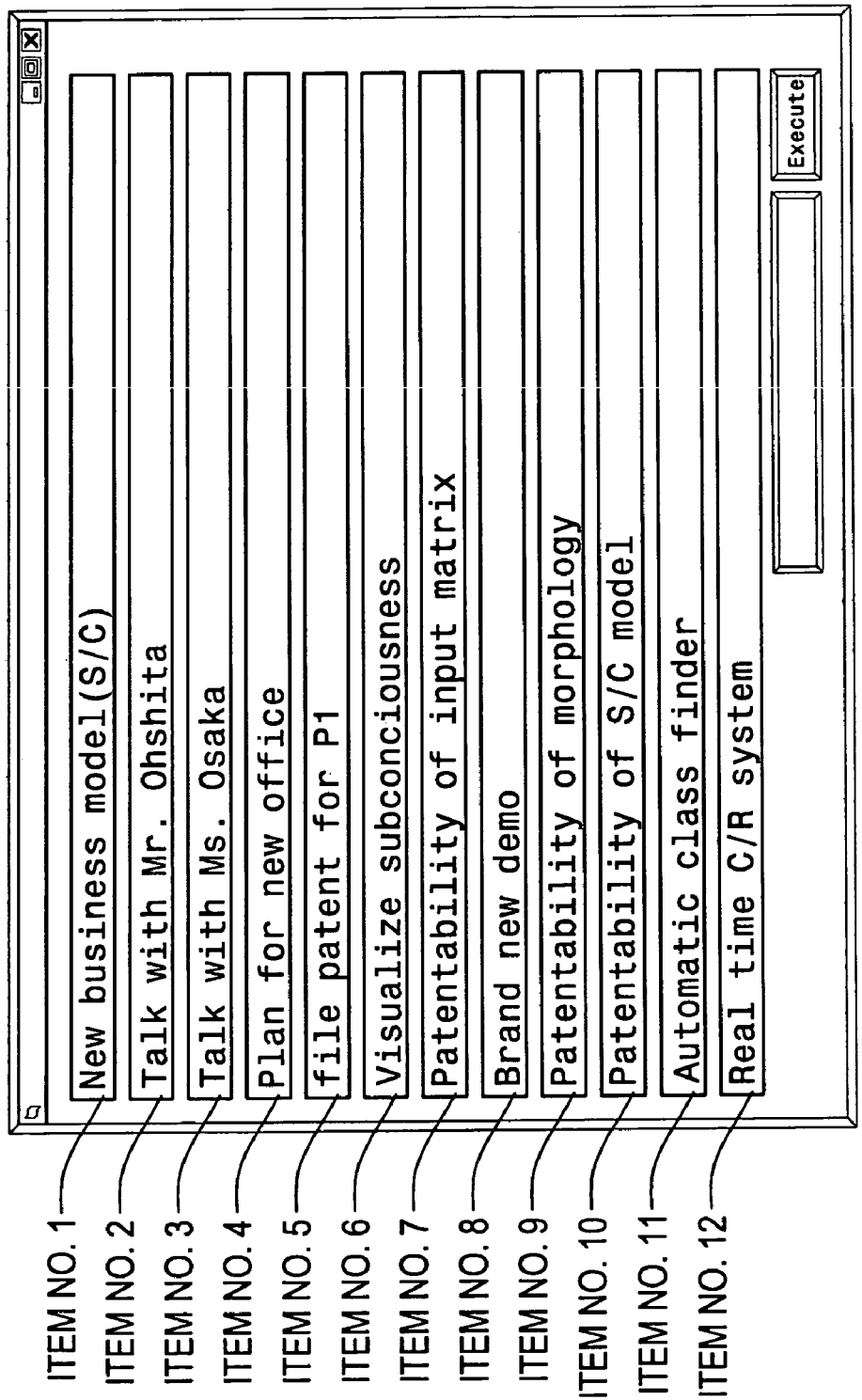
FIG. 6 is a view showing one example of a user interface according to the first embodiment which is used to input items.

The items may be inputted into the computer system using a variety of different methods including, but not limited to, using a user interface such as a graphical user interface. FIG. 6 is diagrammatic representation of a video screen of a display device of the present embodiment, which shows one example of a first graphical user interface 36 according to the present embodiment used for inputting items. In the user interface 36, there are listed items actually inputted by the inventor. As is apparent from FIG. 6, the first user interface 36 of the present embodiment is arranged to accept twelve items in total (referenced by Nos. 1-12 in FIG. 6), and arranged to show all items in a list format so that the individual can confirm these items in the same screen. Further, the first user interface 36 includes an executed button that is operable upon indicating completion of the item-input process.

After the executed button is operated, the process flow goes to Step 3 in which reference Nos. 1-n (n=12 in the present embodiment) are assigned to the obtained items according to the order of input, while the total number a of the items is stored in RAM 14. Step 3 is followed by Step 4 in which a sequence (SEQ) control matrix is automatically generated for controlling an order of making possible pairs of items such that repetition of items in consecutive item pairs is avoided. For the detailed description, the reference is made to FIG. 7(a) which shows one example of the SEQ matrix of the present embodiment, which is generated such that all possible pairs of the items are obtained according to a matrix of FIG. 7(b), while being ordered according to a matrix of FIG. 7(c).

The process flow goes to Step 5 in which a case number variable No. (β) is initialized, e.g., initialized to 1. Step 5 is followed by Step 6 to display every one pair of items identified by the corresponding number variable, in the order of the SEQ matrix. Then, Step 6 is followed by Step 7 to permit the individual to input relation rating for each pair of items using a suitable user interface. In FIG. 7, the Gothic-type numerals represent rating order in Step 7 or displaying order in Step 6, that is, represent the case numbers variable Nos. (β) assigned to the respective possible item pairs, respectively. Wile the matrixes illustrated in FIGS. 7(a)-7(c) include even nine items, due to the size of the drawing sheet, twelve items are obtained in the present embodiment as illustrated in FIG. 6, therefore, it should be understood that the actual SEQ control matrix includes twelve items, and the actual case number becomes 66.

Referring to FIG. 8, there is shown diagrammatic representation of a video screen of the display device which shows one example of a second graphical user interface 38 according to the present embodiment. The second graphical user interface 38 is arranged to list only one item pair identified by the corresponding case number variable β at a time, and to permit the individual to input a relation rating according to his or her perception of relationship between two items of the item pair. Specifically, the second user interface 38 of FIG. 8 is arranged to display the corresponding row item of FIG. 7(a) in its upper side, while the corresponding column item of FIG. 7(a) in its lower side. In the case of FIG. 8, for example, the user interface displays the item No. 2, "talk with Mr. Ohshita" and the item No. 1, "new business model (S/C)" in its upper and lower sides, respectively, in order to allow the individual to assign a relation rating to the item pair. The second user interface 38 includes three selectable buttons representing three alternatives of relation ratings, with respect to relationship between two items of the item pair. The three selectable buttons are labeled with phrases "Few relation", "Some relation" and "Strong relation", respectively. This arrangement permits the individual to assign an appropriate relation rating selected from the three alternatives to the item pair currently displayed.

As is apparent from FIG. 8, the second user interface 38 of the present embodiment further includes a "Back" button and an "Exit" button. The "Back" button is operable to recommence the assignment of the relation rating in Step 7. More specifically, the process flow goes to Step 8 to detect whether the "Back" button is operated. If an affirmative decision (YES) is obtained in Step 8, the process flow goes to Step 9 to decrease the case number variable β by one, whereby the process flow goes back to Steps 6 and 7 where the item pair identified by the last case number variable is reassigned with the reselected relation rating by the individual.

If a negative decision (NO) is obtained in Step 8, that is, if the "Back button is not operated, the process flow goes to Step 10 in which the value corresponding to the obtained relation rating is set in the corresponding element of a relation matrix 40 (see FIG. 9) for the item pair identified by the case number variable β. In other words, the rating matrix is modified to include the relation rating from the item pair identified by the case number variable β. Meanwhile, this relation matrix 40 is of a square matrix wherein the same items are listed both in the rows and columns in the same order. That is, a relation rating between the item of row No. i and the item of the column No. j may be provided as the elements $a_{ij}$, and $a_{ji}$ of the relation matrix. It should be understood that the required number of rating times is a half of the square of the number of items, owing to the fact that the relation matrix is a symmetric matrix. Further, each diagonal element of this symmetric matrix is automatically provided with a value larger than any one of the values of the above-mentioned three alternatives, for representing the strongest relation between itself.

Subsequently, the process flow goes to Step 11 to verify whether the obtained relation ratings are acceptable in view of balance of frequencies of occurrences. If the negative decision (NO) is obtained in Step 11, namely, the obtained relation ratings are not acceptable, the control flow goes to Step 12 to display warning for visually notifying the individual of unacceptability of the relation ratings. Step 12 is followed by Step 13 to allow the individual to determine whether reassignment of the relation ratings to the all item pairs is required. If the affirmative decision (YES) is obtained in Step 13, that is, the reassignment of the relation ratings is required, the process flow goes back to Step 5 to recommence the routine of Step 5 through Step 11 for re-obtaining the relation matrix.

The verification in Step 11, that is, verifying whether the relation rating is acceptable, is generally performed by examining whether the currently obtained relation rating may possibly make the frequency of occurrence for the rating unbalance. In the present embodiment, for example, the verification in Step 11 is made to determine whether a rate of the number of times for selecting a particular relation rating, e.g., a rating "0" representing the "Few relation" to the total number of times for rating, is within a predetermined tolerant range, (e.g., within a range from 1/10 to 2/3). In other words, the relation rating is considered to be unacceptable, if the relation rating has been used for more than a particular frequency. If the frequency of occurrence of the particular rating exceeds the predetermined range, that is, if the negative decision (NO) is obtained in Step 11, the process flow goes to Step 12 to display warnings such as "Too much Few relation", or "Too less Strong relation". In this respect, the warnings of "Too much Few relation" and "Too less Strong relation" may possibly be displayed in the same time, since an examination of the frequency of occurrence of the relation is separately performed for the respective three alternative ratings. For instance, the above-indicated two warnings may be displayed in the same time when the individual selects "Strong relation" for 0 time, "Some relation" for 1 time, and "Few relation" for 7 times, for assigning the relation ratings to the eight item pairs.

On the other hand, if the affirmative decision (YES) is obtained in Step 11, that is, if the obtained relation rating is acceptable, or if the negative decision (NO) is obtained in Step 13 that is if the reassignment of the relation ratings to the all item pairs is not required, the process flow goes to Step 14 to determine whether the all item pairs are rated. If any item pairs remain to be rated, the negative decision is obtained in Step 14, whereby the process flow goes to Step 15 in which the case number variable is increased. Once the case number variable is increased, the process flow goes back to Step 6 to recommence the routine of Step 6 through Step 14, for reassigning appropriate relation ratings to the remained item pairs.

In the present embodiment, acceptance of the obtained relation ratings (cumulative number of each relation rating) is verified whether the occurrence frequency of the selected relation rating is within a predetermined tolerable range, based on a relationship between the currently selected relation rating and all of the relation ratings which have been selected. Since the total number of the previously selected relation ratings does not change promptly, the warning tends to be displayed every time upon selecting the relation rating, once the occurrence frequency or cumulative number of the any one of the relation ratings is deviate from the tolerable range and the negative decision (NO) is obtained in Step 13 to continue the following routine, without recommencing the reassignment of the relation ratings to the all item pairs. In view of this, the process routine may be arranged to display such a warning every eight repetition of the routine of Steps 6-14.

Figure 9:
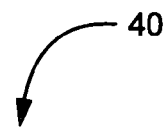
FIG. 9 is a diagrammatic representation of one example of a relation matrix according to the first embodiment of the present invention.

Referring to FIG. 9, there is shown one example of the relation matrix 40 according to the present embodiment. This matrix 40 is generated based on the items and the relation ratings of the all possible item pairs, which are actually inputted into the computer system by the inventor. As is apparent from FIG. 9, the rating matrix of the present embodiment is a symmetric matrix which includes diagonal elements to which a constant numerical value "3" is assigned. Further, the three alternative relation ratings, i.e., "Few relation", "Some relation" and "Strong relation" are converted into three numerical values "0", "1", and "2", respectively. Then, the numerical value "0" is set to the corresponding elements of the item pairs having "Few relation", and the numerical value "1" is set to the corresponding elements of the item pairs having "Some relation", while the numerical value "2" is set to the corresponding elements of the item pairs having "Strong relation". Thus, there is obtained the relation matrix 40 shown in FIG. 9.

On the other hand, if the affirmative decision (YES) is obtained in Step 14, that is, if a completion of relation rating of the all possible pairs is confirmed in Step 14, the process flow goes to Step 16 to execute the routine as illustrated in FIG. 5, for detecting a particular item unrelated to all other items, i.e., a unique item, and possibly removing such a unique item from the matrix 40 of FIG. 9, as needed. The routine of FIG. 5 is initiated with Step 16 in which an incremental counter "γ" is set to an initial value e.g., 1. Once the counter "γ" is set for a particular item of the matrix, e.g., an item of the "γ"th raw, a determination is made in Step 17 regarding whether item "γ" is unrelated to all other items of the matrix. Such a determination may be made by using a variety of different methods including, but not limited to, scanning the rating matrix for the value which indicate that item "γ" has no relationship with any other item. In the present embodiment, for example, the item is considered as a unique item if the corresponding raw elements, except the diagonal element, contain the numerical value 0 in total. Such a unique item is deleted from the matrix in the following Step 21, in view of that such the unique item may adversely affect on the following processes i.e., a statistical process of Singular Value Decomposition (S.V.D). If the negative decision (NO) is obtained in Step 17, that is, no item is considered as the unique item, the process flow goes to Step 18 to determine whether item "γ" is almost unrelated to all other items of the matrix, that is the item "γ" is considered as a sub-unique item. In the present embodiment, for example, the item "γ" is considered as the sub-unique item if the corresponding raw elements, except the diagonal element, contain the numerical values not more than 3 in total. If the affirmative decision is obtained in Step 18, that is, the item "γ" is considered as the sub-unique item, the process flow goes to Step 19 to display warnings on the video screen of the display device for visually warning the presence of the sub-unique item. Step 19 is followed by Step 20 to allow the individual to determine whether the sub-unique items is removed from the matrix. If the affirmative decision is obtained in Step 20, the sub-unique item is deleted from the relation matrix in Step 21. Step 21 is followed by Step 22 in which the relation matrix is resized using the all other items, except the removed unique and sub-unique items.

Subsequently, the process flow goes to Step 23 to determine whether the value of the incremental counter "γ" becomes equal to the number "α" of items. If the negative decision (No) is obtained in Step 23, the process flow goes to Step 24 in which the incremental counter "γ" is increased by one. Then the process flow goes back to Step 17 to execute the routine of Steps 17-22, for examining uniqueness and almost uniqueness for the remaining items.

If the affirmative decision (YES) is obtained in Step 23, that is confirmation is made for completion of examination of uniqueness and almost uniqueness of the all items, the process flow goes to Step 25 for performing the above-mentioned Singular Value Decomposition (S.V.D), or the like, on the relation matrix, thereby transforming the relation matrix 40 to a display matrix 42 which reflect the relationship between the all items on the representation space. This S.V.D permits a transformation of the relation matrix 40 of higher order having a large number of character dimensions (12 dimensions in the present embodiment if no items is deleted as the unique or sub-unique items) into the display matrix 42 of lower order representing a representation space having a small number of character dimensions.

Step 25 is followed by Step 26 in which a cluster analysis is performed using the display matrix obtained in Step 25, providing a suitable number of clusters, e.g., three clusters in the present embodiment, each including the items as elements.

Figure 10:
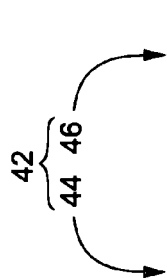
FIG. 10 is a diagrammatic representation of one example of a display matrix according to the first embodiment, which is transformed from the relation matrix by performing a singular value decomposition on the relation matrix.

Referring to FIG. 10, there is shown a display matrix 42 containing a resultant matrix 44 as a result of S.V.D, and a cluster column 46 as a result of the cluster analysis. As is apparent from the display matrix 42, the relation matrix 40 is diminished into the three dimensional display matrix having three principal axes, i.e., a first axis (X-axis), a second axis (Y-axis) and a third axis (Z-axis) which are orthogonal with each other, in the present embodiment. The display matrix 42 of FIG. 10 also shows that the upper half of the listed items is the same as the lower half of the listed the items, due to that the relation matrix 40 is a symmetric matrix. Thus, one of the upper or lower half of the listed items may be deleted from the result matrix as well known in the art.

The result matrix 44 of FIG. 10 includes a "relative marginal frequency" column which contains, for each item, a frequency of marginal distribution of the relation matrix 40 associated with the item, in other words, a representation of the sum of all relations associated with the item, so that the "relative marginal frequency" is a so-called "mass". Regarding each principal axes, i.e., X-, Y- and Z-axes, a "coordinate" column, an "absolute contribution" column, and a "relative contribution" column are provided. The coordinate column contains, for each item, a coordinate value with respect to the corresponding principal axis associated with the item, upon projecting the item on the corresponding axis. The absolute contribution column contains, for each item, a ratio of contribution of the item with respect to each principal axis, while the relative contribution column contains, for each item, a ratio of variance of the item explained by each principal axis. Further, the result of the cluster analysis are presented in the cluster column 46 which contains, for each item, a cluster-identifying number associated with the item. That is, items having the same cluster number belong to the same class.

Referring back to FIG. 5, after the display matrix is generated in Step 27, the control flow goes to Step 28 in which the result of the S.V.D. and the cluster analysis, as illustrated in the display matrix 42, is displayed in a suitable display format so that the result of the analysis can be visually recognized, whereby the series of routine for analyzing the thought system of the inventor regarding the matters and/or events which appear to be related with his task, is terminated.

It should be understood that various kinds of display format may be employed for visually providing the result of the thought-system analysis of the present invention, in view of requirements. For instance, the analysis result may be simply printing or displaying on the display screen using the result matrix of FIG. 10 in its original form or in a modified form wherein only a required data is selected. Alternatively, the result of thought-system analysis of the present invention may be displayed or printed in suitable graphical formats, e.g., two dimensional coordinates as illustrated in FIGS. 11-14, according to the display matrix of FIG. 10, where each item is plotted on its coordinates with a circular object. The analyzing result displayed in such a two dimensional coordinate makes it possible that the individual can visually or instinctively recognize character of each item by observing a position of the items on the two dimensional coordinate. The two dimensional coordinates respectively shown in FIGS. 11-14 are arranged such that radii of the circular objects may be varied based on values of contribution or the like, by each item to the particular axis, in order to interpret the meaning of axis.

Figure 11:
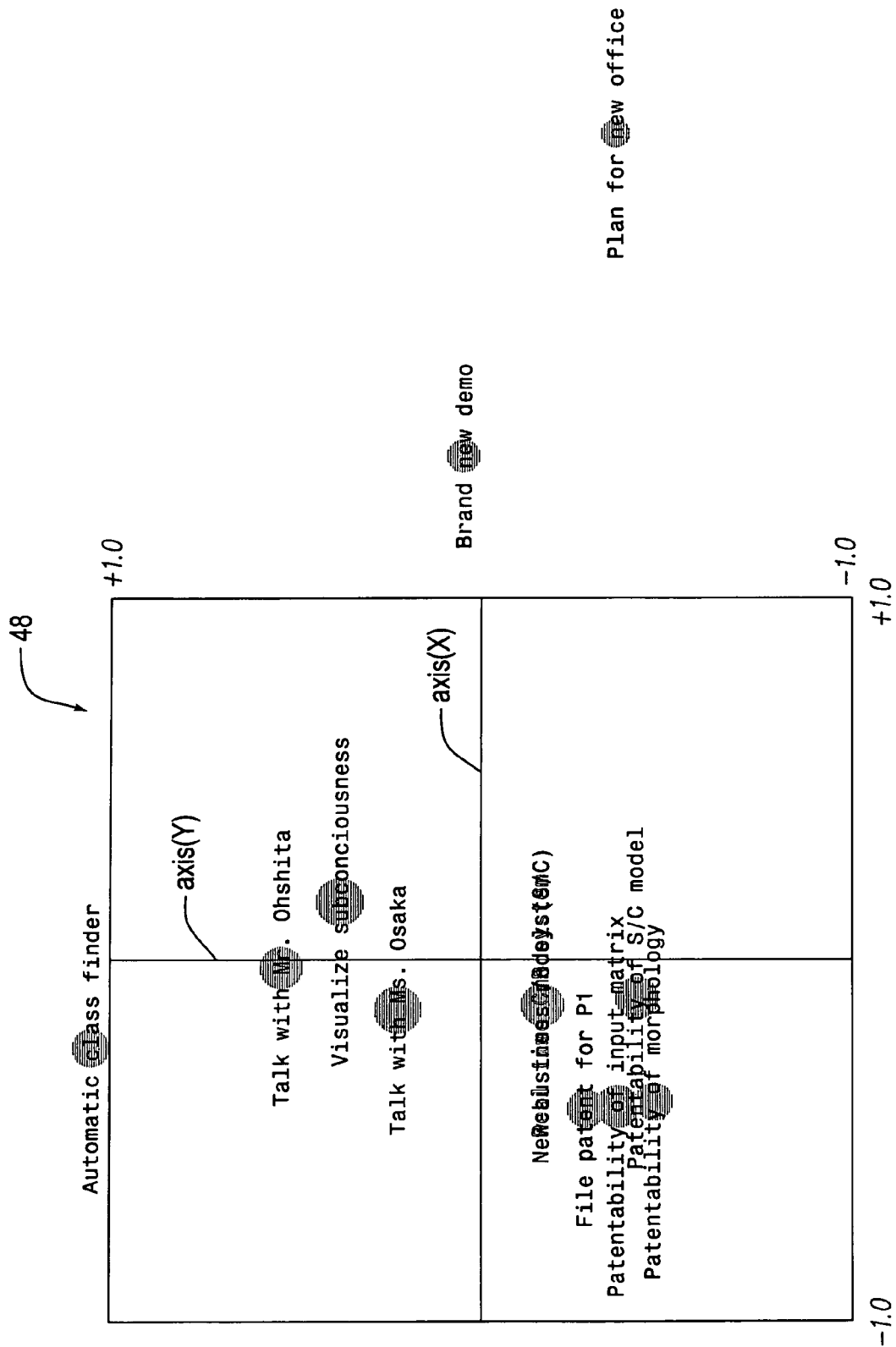
FIG. 11 is a view illustrating one example of a graphical display format according to the first embodiment of the present invention wherein the items are plotted on a two dimensional coordinate based on the result in the singular value decomposition as indicated in the display matrix of FIG. 10.

By way of example, in the display format of FIG. 11, the radii of the circular objects may correspond to values of the relative marginal frequency of the respective items. In the display format of FIG. 12, the radii of the circular objects may correspond to values of the absolute contribution of the respective items with respect to the first axis (X-axis). In the display format of FIG. 13, the radii of the circular object may correspond to values of the absolute contribution of the respective items with respect to the second axis (Y-axis). Further, in the display format of FIG. 14, the radii of the circular objects may correspond to the quality of representation of the respective items over the first and second axes. The quality of representation interprets the sum of the values of the relative contribution of each item to the particular axis and gives the goodness of fit of the each item's representation in a subspace.

As discussed above, the analyzing method for the thought system according to the present embodiment is capable of effectively and efficiently organizing a plurality of items, which are not clearly organized by the individual with his or her own specific scale of rating or meaning, but are perceived by the individual as ambiguous and various thought item, by using a scientific or statistical process, while effectively utilizing the relationship information, i.e., relation ratings between two items of each of the all possible pairs of the items which are ambiguously recognized by the individual. The present analyzing method makes it possible to generate the representation space as a latent semantic space on which various kinds of dimensions of the plurality of items are fitted with respect to at least one principal dimension axis thereof, to clearly shown the relationship between the plurality of items.

As is apparent from the foregoing description, the statistical process used in the present invention is different from a correspondence analysis generally known in the art. Namely, the correspondence analysis requires two sets of variables clearly divided from each other, while the analyzing method of the present invention does not need such two sets of variables. This means that statistical method such as a multivariate analysis may effectively be applicable even to the thought items that seems to be ambiguously correlated with each other and seems not to be divided into two or more groups. Moreover, such an application of the statistical method for analyzing the thought system effectively provides unthinkable results such as a detection of unknown factor of the thought system by a factor analysis, and a detection of an unknown principal component of the thought system by a principal component analysis. This means that the method of analyzing the thought system of the present invention permit the subject to perceived or recognize his or her subconscious thought which is never noted by the subject as principal dimension axes on the representation space. Namely, the representation space is arranged to reflect the perceived relation ratings between two items of each of the all-possible item pairs. Based on these perceived relation ratings of the items, the principal dimension axes are extracted on the display space. By observing the principal dimension axes, the subconscious thought is effectively revealed.

According to the present embodiment, there is initially obtained from the individual the list of items of ambiguous thoughts that are perceived by the individual such that these items are not clearly organized, but appears to be related with each other. Subsequently the individual is requested to reply the queries regarding the relationship between two items of the all possible pairs of the items, which queries are arranged to become ambiguous on purpose, e.g., the queries are arranged to ask an abstract relation rating between the two item. This arrangements is effective to obtain suitable relationship information data which may be ambiguous but may be usable for the statistical analysis executed later. In particular, these queries have no objective or significant standard for judgement of the relation rating, so that the individual may feel difficulty in judging the relation rating at first, but may gradually feel easiness for the judgement, whereby a response time required for the individual to judge the relation rating of the two item is gradually shortened. Therefore, the queries of the present embodiment arranged as described above, is capable of obtaining an abstract semantic-axis existing latently under the individual's perception (thought system) from ambiguously obtained relation rations of the items. In this respect, one of the advantageous feature of the present invention exists in the point that the abstract semantic-axis which does not perceived by the individual may be extracted by using the statistical analyses on the ambiguous relation ratings of the items.

Namely, the presence of the objective or substantive standard with respect to a "relationship" undesirably limits a source of the thought items to the items clearly and theoretically recognized by the individual, resulting in an unsatisfied result of the analysis, i.e., a typical result of the statistical analysis. To avoid this drawback, the thought system analyzing method and apparatus of the present invention eliminates objective or substantive standard, permitting an ambiguous judgement by the individual of the relationship between two items of each of the all-possible item pairs. Thus, it may be possible to extract the semantic dimension functioning as a clue for detecting an essential axis of the thought system as a whole.

Particularly, the analyzing method of the present embodiment employs the SEQ control matrix of FIG. 7 to control the order of obtaining relation rating between two items of the all possible item pairs, such that repetition of items in consecutive item pairs is avoided. That is, the SEQ control matrix is arranged to prompt the individual to make a non-logical or a non-systematic decision on the relationship between each item and the all other items. This arrangement effectively prevents occurrence of distortion of the decision due to a logically or a systematic decision on the relationship between items, upon extracting the essential axis of the thought system of the individual, leading to accurate extraction of the essential axis of the thought system.

Accordingly, the analyzing system of the present embodiment permits objective extraction of principal or essential axis or classes of a human thoughts which seem to exist in a depth psychology of the human's subconscious, as well as classification of the thought items appears in the human's conscious. In the analyzing method of the present embodiment, for example, the individual is simply required to input twelve items perceived by him or her, and to input his or her perception of relationship between two items of each of the all possible item pairs. Based only on the relationship information inputted by the individual, the suitable static analysis is performed, whereby the desired essential axis of the individual's thoughts may be obtained in the form of the display matrix representing a coordinate space as a latent semantic space. The obtained display matrix is visually presented in the preferable graphical formats of FIGS. 11-14 where each perceived item is plotted in the coordinate space. Accordingly, the individual can recognize essential gist of his or her thoughts that have not been perceived by himself or herself, by observing these graphs of FIGS. 11-14.

While there will be described in detail about unique features and advantages of the present embodiment, with reference to FIGS. 11-14, for illustrative purpose, it is to be understood that the present invention is not limited to the details of the present embodiment.

Figure 12:
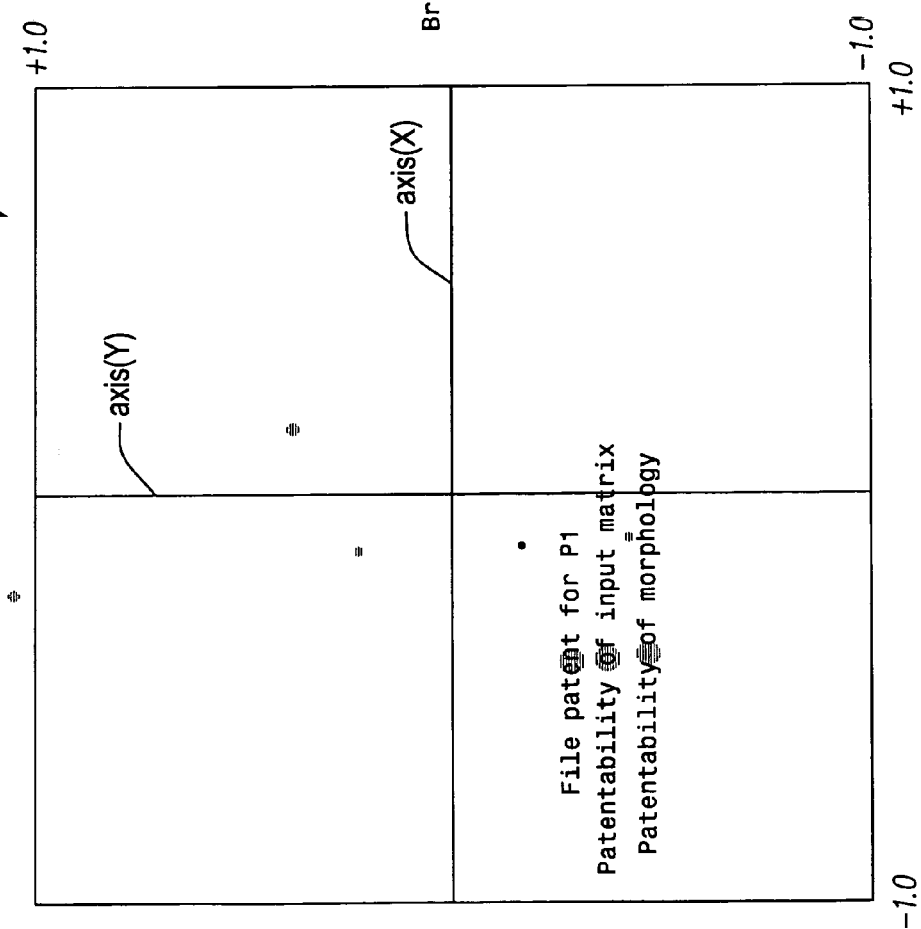
FIG. 12 is a view illustrating another example of the graphical display format according to the first embodiment of the present invention, corresponding to FIG. 11.

Referring to FIG. 12, there is shown diagrammatic representation of a two dimensional graph 50 as a graphical display format having an x-axis and a y-axis. As well known by those skilled in the art, x-axis and y-axis may represent various quantities or variables. With respect to x-axis, it is easily noted that relatively high contribution to x-axis is loaded by the two items "Plan for new office" and "Brand new demo". Since the common factor of these two items is "new", the inventor can find first from the graph 50 of FIG. 12 that his perceived items may be arranged by dividing into two groups, i.e., "new matters" and "the others". In this respect, it should be understood the fact that the inventor finds the way to arrange the items based on time for the first time after he observes the analyzing result projected on the graph 50 of FIG. 12. Namely, the inventor neither recognizes the time-associated arrangement of the items upon listing the twelve items, nor prepares any specific scale such as a time-associated scale, for judging the relation rating between two items of each of the all possible item pairs.

Further, the individual (in this case, the present invention) can find that three items each somewhat strongly contributing to x-axis gathered on the left side of the graph (i.e., coordinate). The all three items have a strong relation to the specific factor "P1" which concerns the specific patent, although it is difficult to understood for the other person, except the inventor. With the observation of the graph of FIG. 12, the inventor understands that the three items commonly relating to "P1" make a group or class characterized by the same concept "P1". In this respect, it is fully acceptable for the inventor that only the above-indicated three items are grouped into the same class, although there is another item which includes the word "patent", but not relate to the specific patent "P1", as shown in the graph 48 of FIG. 11. It is also fully acceptable for the inventor that the items relating to "P1" have the smallest value of x-axis or coordinate so as to be arranged as the most oldest matters, while the item "patent for new business model (s/c)" has few contribution with respect to x-axis, even though this item including the word "patent". In view of the above, it is assumed that x-axis has strong relation to time. It should be understood that x-axis represents one of the orthogonal axis of the inventor's thought, which is not simply characterized by the name of the time axis, so that the x-axis is not recognized by the inventor at the beginning of the analyzing method. However, with the particular statistical method, that is, S.V.D in the present embodiment, the twelve items is effectively arranged with respect to a specific axis, i.e., x-axis whose component has not been recognized. After observing the x-axis, the inventor can recognize that the x-axis is associated with time. This means that the present analyzing method and apparatus is capable of extracting the frame of the inventor's thought having an essential axis of dimension, e.g., x-axis associated with the time frame, without adverse influence of words of the items, such as "patent".

Figure 13:
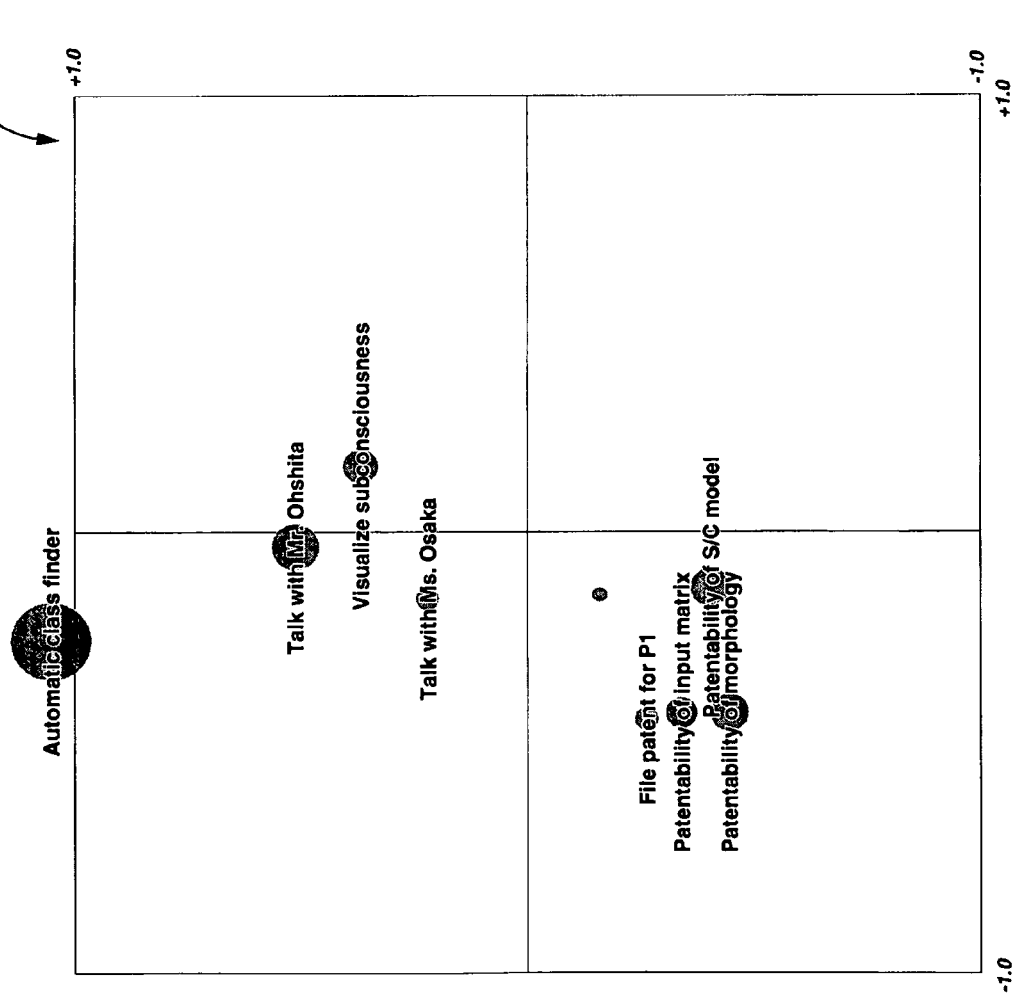
FIG. 13 is a view illustrating yet another example of the graphical display format according to the first embodiment of the present invention, corresponding to FIG. 11.
Figure 14:
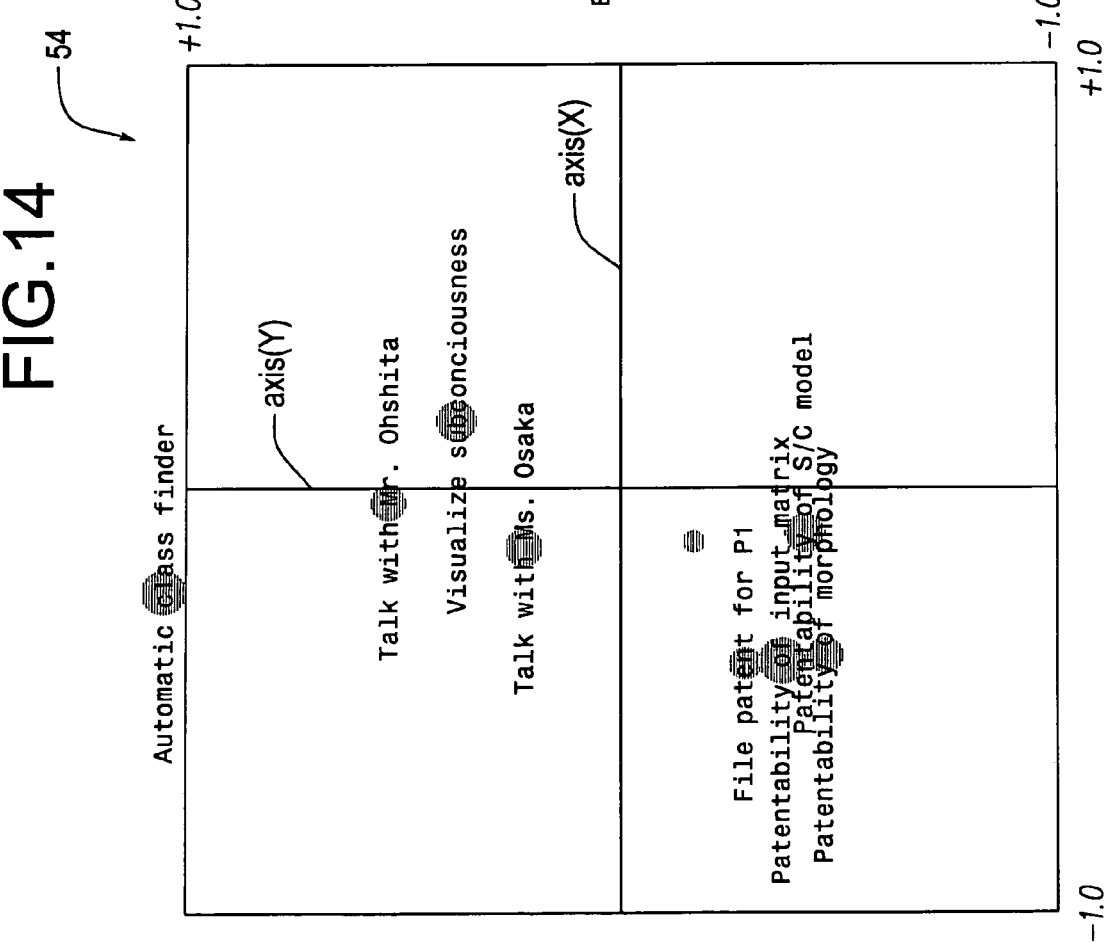
FIG. 14 is a view illustrating still another example of the graphical display format according to the first embodiment of the present invention, corresponding to FIG. 11.

Referring next to FIG. 13, there is illustrated diagrammatic representation of a two-dimensional diagram 52 as another display format, wherein the items having a negative value of x-axis (not new), are divided into two groups which are plotted in two different regions which are spaced from each other in the direction of y-axis. In this respect, it is noted that the items having a positive value of x-axis, i.e., the items regarding new matters have a little contribution to y-axis. This may be because the new items have not yet divided into any groups with respect to y-axis in the inventor's thought. With observation of the graph 52 of FIG. 13, the inventor understand that the item "Automatic class finder" which is plotted in the upper side of y-axis is a matter of underdevelopment, while a group of items which is plotted in the lower side of y-axis is a matter which has been developed to some extent. Like in the case of the graph 50 of FIG. 12, the inventor did not recognize that the items may be clustered with respect to y-axis, i.e., with respect to states of development thereof, until he observe the graph 52. As a result, the graph 52 allows the inventor to find and recognize y-axis as another essential axis of his thought. Further, in the graph 52 of FIG. 13, the items "talk with Ms. Osaka" and "talk with Mr. Ohshita" are plotted in the upper side of y-axis where the developing item "Automatic class finder" is plotted. With the observation of the graph 52, the inventor can recognize then for the first time that the items "talk with Ms. Osaka" and "talk with Mr. Ohshita" which are concerned with the developing item "Automatic class finder", may be classified into a group of developing matters and are distinguished from the group of developed matters plotted in the lower side of y-axis and the group of new matters plotted in the right side of the graph 52 which have not yet been matured to be discussed with someone. This inventor has never been recognized such a classification of the items before performing the analyzing method of the present embodiment. In particular, the item "talk with Ms. Osaka" has a value of y-axis smaller than that of the item "talk with Mr. Ohshita", while being plotted near the items in relation with the specific patent "P1". This means that the inventor should talk with Ms. Osaka not only about development of the "automatic class finder", but also about the specific patent "P1". TO the inventor's great surprise, the graph 52 shows that the items "talk with Mr. Ohshita" and "talk with Ms. Osaka" are plotted on the respective locations different from each other, and that each location corresponds to a weighted average of items about which the inventor wishes to discussed with Mr. Ohshita or Ms. Osaka.

According to the thought-system analyzing method and apparatus of the present embodiment, a plurality of items (a set of items) perceived in the subject's (inventor's) conscious are obtained as a tentative data. Then, there are performed specific mathematical or statistical methods which is arranged to reveal a latent structure of the subject thought from the obtained set of items, resulting in extraction of an essential axis of dimension of the subject thoughts.

Then, the result of the analyzing method provides the display matrix which permits a clear and entire projection of a thought system of the subject on the thought display space, which is not even recognized by the subject before the analyzing method is executed. Thus, the present analyzing method is effective to arrange and recognize the entire of the subject's thought system which generally has the structure of multivariate dimensions in which a plurality of elements are complicatedly related with each other.

Further, by only observing items plotted on the display space according to the display matrix, the subject can recognize the thoughts of his or her subconscious as a root of the perceived thought of the subject's conscious, permitting an effective organization of his or her thought. The present method may be effectively utilized for making a decision of ideas or way of act, solving problems, mental treatments such as psychological understanding, psychological analysis and the like.

While the present embodiment is arranged to display the all items with the same color as in FIGS. 11-14, the display device constructed according to the present invention may preferably be arranged such that the items are displayed with the different colors which are varied corresponding to the cluster numbers, provided the display device or the printer is available for a color display or printing. This arrangement facilitates recognition of the difference between the clusters, improving efficiency and accuracy of recognizing the frame of the thought space of the subject.

Referring next to FIGS. 15-21, there will be described a second embodiment of the present invention. The thought-system analyzing method and apparatus according to the first embodiment are arranged to analyze a thought system of one individual, using as multivariate a plurality of items perceived by the individuals, which items are fabricated by the individual in the form of phrase. On the other hand, the thought-system analyzing method and apparatus according to the present embodiment are arranged to analyze a thought system of an individual upon making a decision on a specific subject under a predetermined conditions, wherein multivariate consist of a plurality of items in the form of words or phrases which are selected by the individual from the predetermined conditions. The predetermined conditions may be applied to the subject (an individual in the present embodiment) in various forms, such as information literally described. The analyzing apparatus of the second embodiment comprises hardware components arranged similarly as in the first embodiment as shown in FIGS. 1 and 2, the detail description to which is omitted to avoid redundancy.

Figure 15:
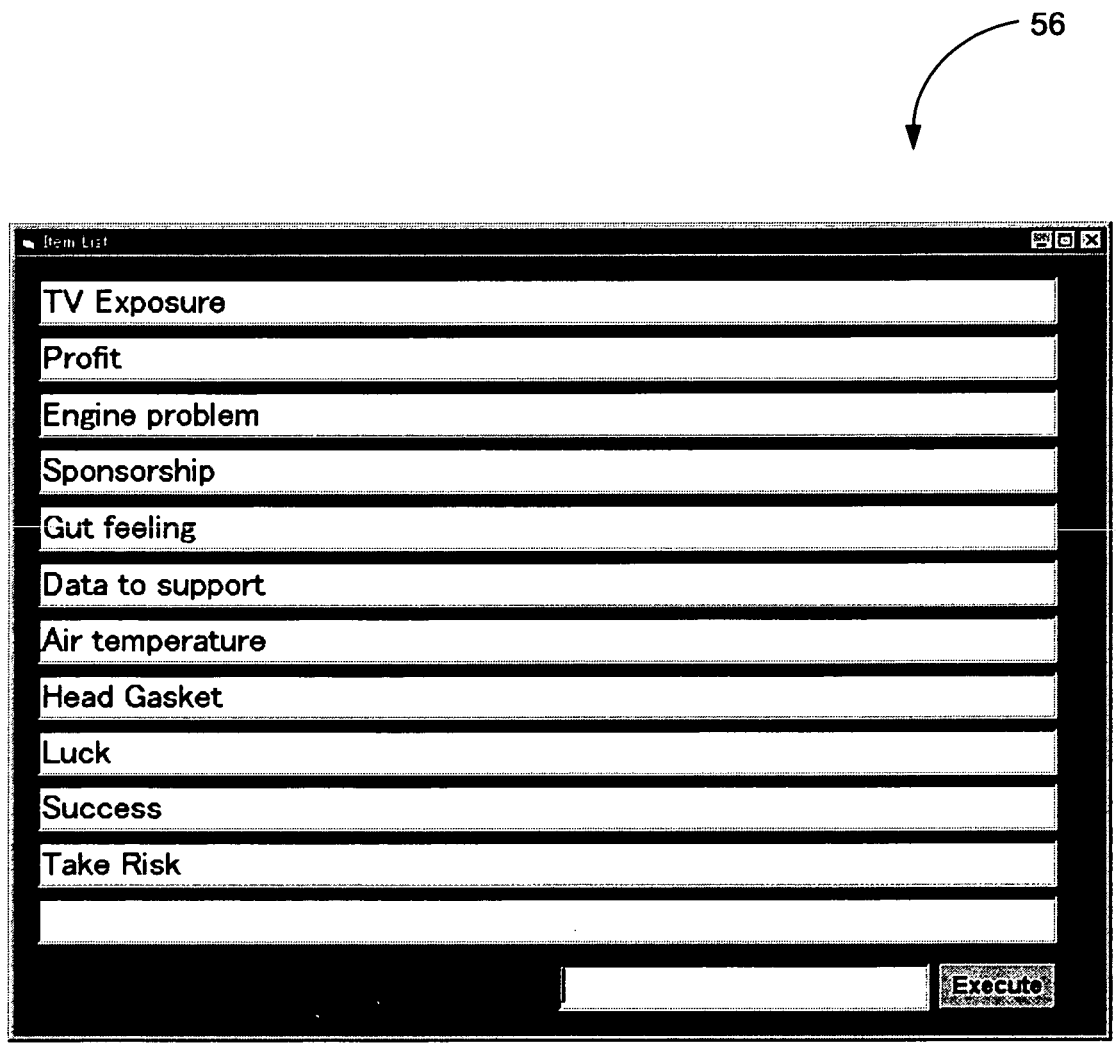
FIG. 15 is a view illustrating one example of a user interface according to a second embodiment of the present invention, wherein a plurality of items perceived by a subject are listed.

There will be described in detail about a process flow according to the second embodiment. Like the first embodiment, the process flow is started with the routin of FIG. 3 for obtaining the multivariate consisting of a plurality of items. Referring to FIG. 15, there is illustrated diagrammatic representation of a video screen of a display device of the present embodiment. FIG. 15 shows one example of a first graphical user interface 56 according to the present embodiment which is used for inputting items and is arranged similar to that of the first embodiment. In the user interface 56, there are listed eleven items obtained from the individual on the display as the user interface arranged similar to that of the first embodiment. In this respect, the listed items consist of words and phrases extracted from an English document which is previously presented to the individual to provide the specific conditions for making a decision on the specific subject. Namely, the individual may choose from the document the eleven key-words and phrases to which he recognize significance. Any documents may be employed in the present embodiment, provided the documents can be usable for providing specific conditions for making the specific decision. In the present embodiment, for example, the document may be a case actually assigned to MBA students to make a decision on the case as a supervisor of a car-racing team. The case generally contains the following: "The team has been improving the score in the recent races, and faces now the critical issue whether the team can make a sponsorship contract with any sponsor. The present race is a final one of this term. Victory on the present race assures an annular sponsorship contract with a big sponsor. However, there was reported about an engine trouble of the racing car, yesterday, indicating a possibility of occurrence of the engine trouble during the race, especially during the TV exposure of the race. The occurrence of the engine trouble during the TV exposure may lead undesirable resolution of the sponsorship contract with the present sponsor. One of the mechanics forecasts that the engine may be broken provided air temperature is low. Another one of the mechanics forecasts the engine lay not be broken in view of the fact that no data proves correlation between air temperature and the engine trouble. Now, it is notified that the air temperature of the day of the race is low." After reading the above-described case, the individual is assigned to make a decision on whether the team should be join the race, within 30 min. The analyzing method and apparatus according to the present embodiment is arranged to analyze a latent essential frame of the individual thought when he or she reads the above case and finally makes the decision on the subject.

Like the first embodiment, the process routine according to the flow chart of FIGS. 4 and 5 is executed for generating a relation matrix 58 of the eleven items as illustrated in FIG. 16. The present embodiment is also arranged to allow the individual to input a relation rating between two items of each of the all-possible pairs of the eleven items. The obtained relation ratings is used to obtain the relation matrix 58 of FIG. 16, which is a symmetric matrix where the rows and columns contains the same items, as in the first embodiment.

Figure 18:
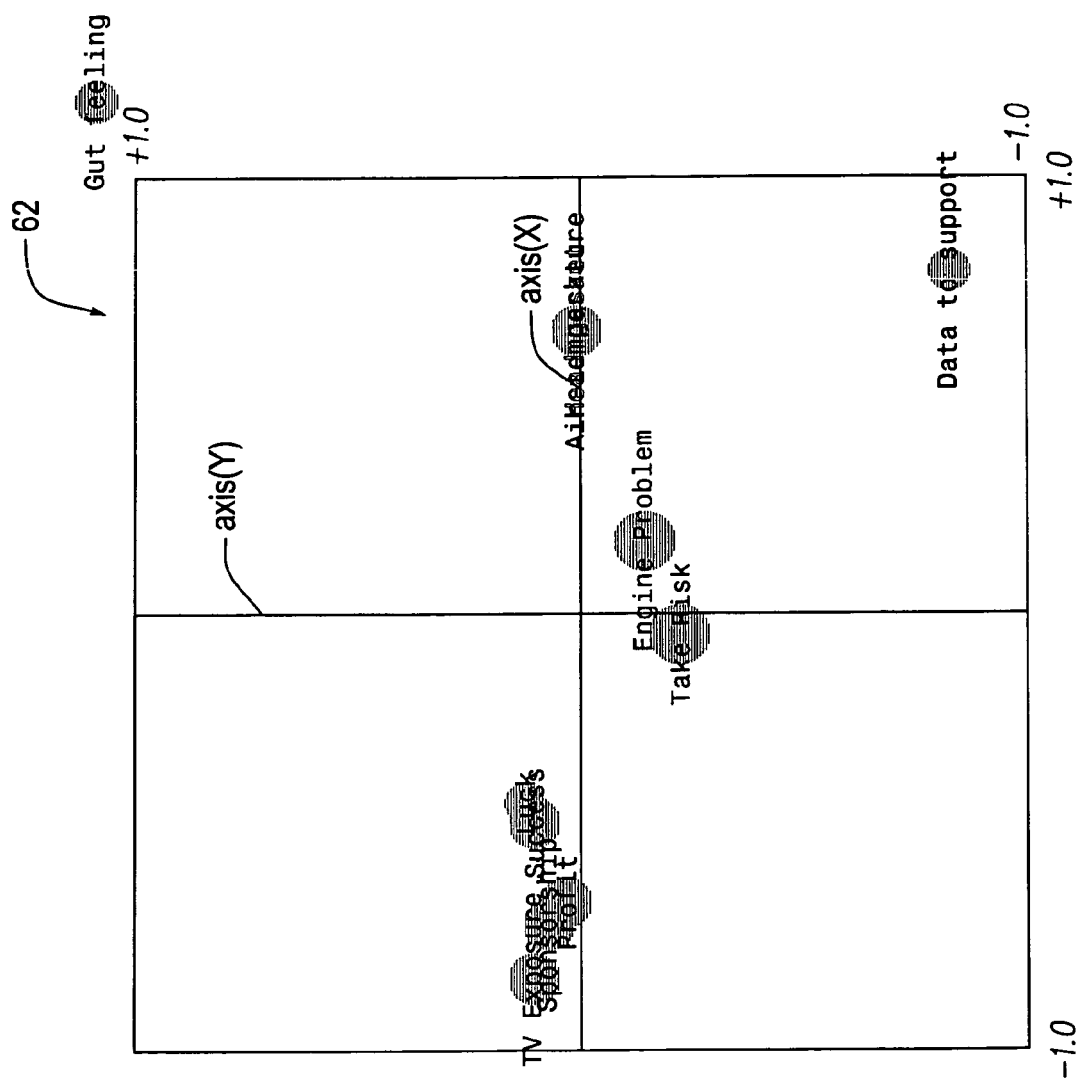
FIG. 18 is a view illustrating one example of a graphical display format according to the second embodiment wherein the items are plotted in a two dimensional coordinate based on the result in the singular value decomposition indicated in the display matrix of FIG. 17.
Figure 19:
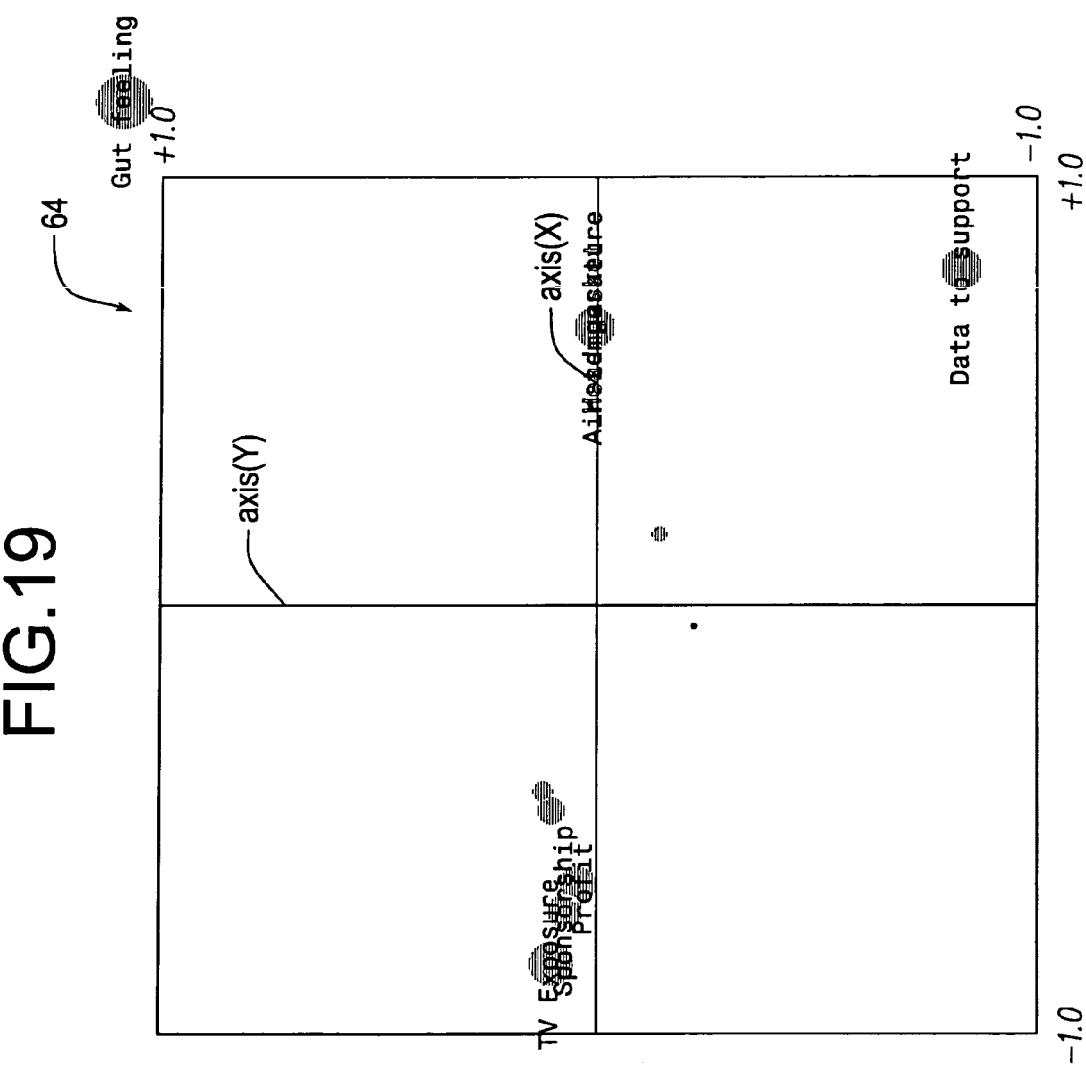
FIG. 19 is a view illustrating another example of the graphical display format according the second embodiment of the present invention, corresponding to FIG. 18.

Subsequently, the process routine of FIG. 5 is executed as in the first embodiment, for generating a display matrix. FIG. 17 shows a display matrix 60 as well as a result of a cluster analysis. Further, the process routine according to the flow chart of FIG. 5 is executed, to display or print a result of the analysis in various graphical formats as illustrated in FIGS. 18-21 according to the display matrix 60. FIG. 18 shows a two-dimensional graph 62 as one example of the graphical formats, wherein each item is represented by a circular object whose radius corresponds to a value of relative marginal frequency, i.e., mass thereof. FIG. 19 shows a two-dimensional graph 64 as another example of the graphical formats similar to the graph 62, wherein a radius of each item is varied corresponding to a value of absolute contribution thereof to the first axis (x-axis). Further, FIG. 20 shows a two-dimensional graph 66 as yet another example of the graphical formats similar to the graph 62 wherein a radius of each item is varied corresponding to a value of absolute contribution thereof to the second axis (y-axis). FIG. 21 also shows a two-dimensional graph 68 as still another example of the graphical formats similar to the graph 62, wherein a radius of each item is varied corresponding to a sum of the values of relative contribution thereof from the first axis to the second axis.

Namely, the thought-system analyzing method and apparatus of the present embodiment employs as the thought items the plurality of words and phrases which are extracted from the document by the individual based on his or her ambiguous perception with respect to these words and phrases such that these words and phrases do not clearly recognized but may possibly be significant to the decision. Thus obtained items may partially represent the complicated thought system of the individual. The items is processed by the circular scientific or statistical method, like the first embodiment, permitting objective representation, e.g., graphs 62, 64, 66, 68 of FIGS. 18-21, of the semantic space of the individual on which the thoughts of the individual are projected.

Therefore, the obtained result of the analysis, which may be observed by the graphical representation of FIGS. 18-21, makes it possible to extract an extraction of an essential frame of the individual's thought which have not been at all perceived by the individual.

There will be described in detail about unique features and advantages of the present embodiment, with reference to FIGS. 18-21, for illustrative purpose it is to be understood that the present invention is not limited to the details of the present embodiment. Like the first embodiment, FIGS. 18-21 show diagrammatic representation of two dimensional graphs 62, 64, 66, 68, wherein the obtained items are plotted by circular objects which varying in radii, although it should be appreciated that the items may generally be represented in a variety of different forms. For instance, the graph 64 of FIG. 19 having x-axis and y-axis shows the items represented by the circular objects are separated into two groups that are opposed to each other in the direction of x-axis. Namely, one of the two groups which is plotted in the left side of the graph 64 includes the items regarding the situation where the race goes well. On the other hand, the other group that is plotted in the right side of the graph 64 includes the items regarding the situation where the race does not go well. Thus, the analyzing result of FIG. 19 reveals the individual judges the subject based on comparison between good situation and bad situation. FIG. 20 shows the graph 66 having x-axis and y-axis shows that the items of "Gut feeling" and "Data-to-support" strongly contribute y-axis, and accordingly have larger radii. Further, these two items "Gut-feeling" and "Data-to-support" are opposed to each other in the direction of y-axis. Thus, the analyzing result represented in the graph 66 of FIG. 20 reveals in y-axis one of the thought dimension of the individuals upon judging the subject, wherein scientific thought based on data and the sixth sense thought based on the individual's feelings are opposed to each other. In particular, the two items that contribute y-axis appears only on the right side of the graph 66, wherein the items regarding the bad situation are plotted. This exactly reveals that the thought dimensions represented by y-axis may affect only on judgement of items regarding bat situation, although the revealed fact was not found even by the subject, before executing the analysis. As is apparent from the analyzing results as described above, the thought-system analyzing method and apparatus of the present embodiment is capable of retrieving the essential axis (i.e., y-axis) of the individual thought system based on which the individual arranges his or her thought system. That is, with the observation of the analyzing result represented in the graph 66 of FIG. 20, the individual can find for the first time that he or she tried to judge the subject on the basis of either the items plotted on the right side of the graph 66, or the items plotted on the left side of the graph 66, for example.

While, the second embodiment of the present invention has been described based on the fictionally case actually used in a class of MBA in the U.S., the present method and apparatus for analyzing the thought system of the subject is not limited to the second embodiment but may otherwise be embodied.

There will be described a third embodiment of the present invention wherein the thought-system analyzing method and apparatus of the present invention is arranged to analyze a thought system such as a consensus of a plurality of individuals. The thought system analyzing method and apparatus of the third embodiment may preferably be applicable for deciding a way of management, discussing about a new product in a planning conference, and the like. The analyzing method and apparatus according to the third embodiment may be used in a conference as follows: First, a plurality of key-wards obtained in a preceding discussion are inputted into the analyzing apparatus as a plurality of items perceived by the subject, i.e., a plurality of individuals, that is members of conference. Then, all members of the conference are discussed to assign an appropriate relation rating to each of all possible pairs of the items. The obtained relation ratings are also stored in the analyzing apparatus. The analyzing apparatus executes a thought analysis according to the present invention based on the stored information, and display an analyzing result in a graphical format for example. The analyzing result of the preceding discussion permits the conference members to arrange their discussed matters and to easily find unnoted matters, a significant thought dimension used for judgement, and the like. Alternatively, it may be possible to proceed further the discussion utilizing the analyzing result of the preceding discussion, and again to analyze the further discussion by means of the present analyzing apparatus. Moreover, the present invention may be embodied by using a network system, facilitating a use of the present analyzing apparatus by a plurality of individuals.

In the third embodiment, the plurality of conference members may be considered as a subject whose thought system is analyzed by the analyzing method and apparatus of the third embodiment. However, the thought-system analyzing method and apparatus may otherwise be modified such that the conference members cooperate to only obtain the plurality of items, while shearing the all possible pairs of items for assigning relation ratings thereto. This arrangement assures an easy and rapid execution of the relation-rating assignment.

Alternatively, the thought-system analyzing method and apparatus according to the third embodiment of the present invention may also be otherwise arranged such that the conference members cooperate to obtain the plurality of items, while each member is requested to assign the relation ratings to the all possible pairs. Then, the analysis of the thought system according to the present embodiment is performed based on each of the relation ratings obtained from each member. The analyzing result for each member is projected into the same space, while differences between the results of the members are displayed as difference vectors. This arrangement facilitates comparison between thought systems of the different members, leading to finding of unnoted matters or another discussing points.

There will be described in detail the thought-system analyzing method and apparatus according to the third embodiment of the present invention, which may be applicable for analyzing a thought system of a subject consisting of a plurality of individuals. In particular, the following description is concerned with a case where two peoples A and B constitute a subject of the analysis. It should be noted that the thought-system analyzing method and apparatus of the present embodiment is essentially arranged such that the items inputted into the analyzing apparatus are common to all the individuals (two individuals in the present embodiment), while two set of relation ratings of the all possible pairs are separately obtained from the respective individuals. These information including the common items and the different set of relation ratings, is analyzed according to the thought-system analyzing method and apparatus of the present embodiment, whereby the thought system of the subject consisting of the plurality of individuals is accurately analyzed.

In the present embodiment, it is supposed that the individual who is the subject of the second embodiment (hereinafter referred to as the individual A) cooperates with the other individual B to choose the eleven items used in the second embodiment. Each of the individuals A and B is requested to separately perform the assignment of the relation ratings to the all possible pairs of items. The obtained common items and the relation ratings of the every individuals are processed by the statistical method as in the second embodiment, so as to obtain a relation matrix 70 as illustrated in FIG. 22. As shown, the relation matrix 70 of FIG. 22 is a juxtaposition matrix which includes a first relation matrix 72 generated for the individual A similar to the relation matrix generated in the second embodiment, and a second relation matrix 74 generated for the individual B which is disposed under the first matrix 72. That is, the juxtaposition relation matrix 70 includes 22 rows and 11 columns wherein the first row thought the eleventh row relate to the individual A, while the twelfth row thought the twenty-second low are relate to the individual B.

Thus obtained relation matrix 70 in concerned with the individuals A and B, may be analyzed by two kinds of methods, for example. One method is arranged to analyze the relation matrix for extracting an aggregated thought system of the individuals A and B. The other method is arranged to analyze the relation matrix 70 for extracting respective thought systems of the individuals A and B. The obtained respective thought systems are fitted into the same thought space, i.e., the same representation space, to thereby clarify a difference in thoughts between the individuals A and B, in other words, a difference in way of thinking with respect to the same item between the individuals A and B.

More specifically described, in the former case, there is initially generated a aggregated relation matrix 76 each element of which has a value obtained by summing up the values of the corresponding elements of the first and second relation matrixes 72, 74 for the individuals A and B. FIG. 23 shows one example of the aggregated relation matrix 76 which is generated from the first and second relation matrix 72, 74. The aggregated relation matrix 76 is processed similar to the second embodiment, thereby generating a display matrix 78 and a set of cluster values as a result of the cluster analysis, as in the second embodiment. The display matrix 78 and the result of the cluster analysis are illustrated in FIG. 24. Also, the display matrix is capable of displaying each item on a representation space (e.g., a graphical format) as a latent semantic space.

Referring next to FIG. 25, there is shown diagrammatic representation of a two dimensional graph 80 as a graphical display format. The two-dimensional graph 80 has a x-axis and a y-axis, wherein each item is plotted in the corresponding coordinate according to the display matrix of FIG. 24, with a circular object whose radius is variable. As mentioned above, the aggregated relation matrix 76 is generated by summing up the first and second relation matrixes 72, 74 for the individuals A and B, respectively, that is the aggregated relation matrix 76 may be prepared by dealing the individuals A and B with a single subject. Accordingly, graph 80 of FIG. 25 clearly projects the position of each item on a representation space, i.e., a thought space which represents a latent semantic space of the single subject, by fitting the space into the two-dimensional graphical format. In this respect, the radius of the each circular object represents the value of relative marginal frequency of the corresponding item.

On the other hand, in the later case, the relation matrix 70 of juxtaposition type of FIG. 22 is initially generated on the basis of the first and second relation matrixes obtained from the individuals A and B, respectively. Subsequently, the same statistical processes as in the second embodiment are performed using the juxtaposition relation matrix 70 of FIG. 22, thereby obtaining a display matrix 82 as shown in FIG. 26. The display matrix 82 is capable of distinguishably display positions of the items according to the individual A and the corresponding positions of the items according to the individual B, on the same display space representing a latent semantic space common to the individuals A and B. That is, the display matrix 82 permits displaying the common display space to the individuals A and B. Moreover, the display matrix 82 is capable of displaying a difference in recognition of a relationship between each item to the other items, between the individuals A and B.

Figure 27:
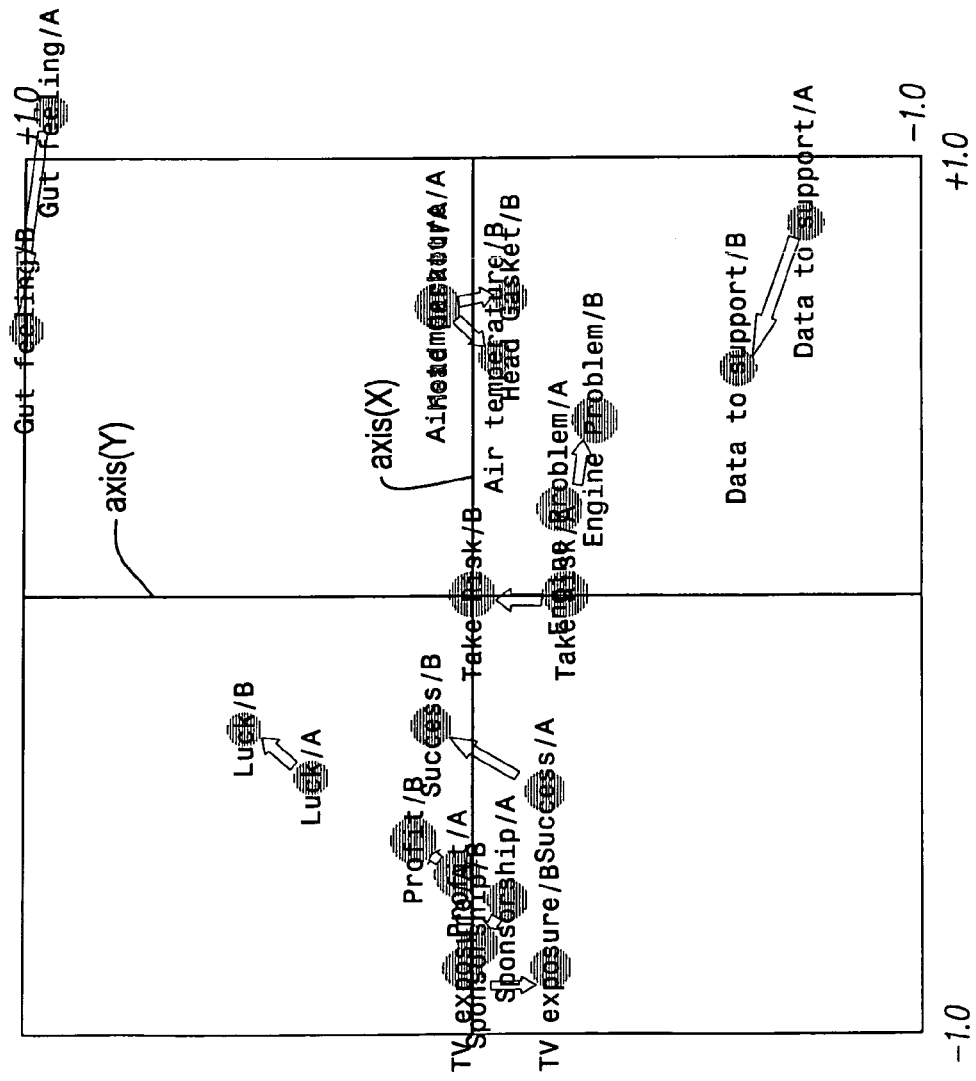
FIG. 27 is a view illustrating another example of the graphical display format according to the third embodiment of the present invention, wherein items are plotted on the two dimensional coordinate based on the display matrix of FIG. 26.

Referring next to FIG. 27, there is shown diagrammatic representation of a two dimensional graph 84 having a x-axis and a y-axis, wherein two sets of items are plotted with the circular objects, according to the display matrixes for the individuals A and B. Namely, the thought systems of the individuals A and B are projected on the same representation space which represents a latent semantic space common to the individuals A and B. In this respect, the radius of the each circular object corresponds to the value of relative marginal frequency of the corresponding item.

The analyzing result as shown in the two-dimensional graphs 80, 84 visually clarify the following matters. Namely, the juxtaposition relation matrix 70 of FIG. 22, that is the first and second relation matrixes 72, 74, clarify a difference between the individuals A and B in their perceptions of relationship between each item and the other. Based on the juxtaposition relation matrix 70, there is generated a difference matrix 86 each element of which corresponds to the difference between the corresponding elements of the first and second relation matrixes 72, 74 for the individuals A and B in the juxtaposition relation matrix 70. As is apparent from the difference matrix 86, the individuals A and B assign different relation ratings with respect to 25 item pairs among the 55 item pairs. Since the juxtaposition relating matrix 70 is a result from the relation rating on three levers, provability of the accident coincidence is ⅓ at random. In view of this, the rate of coincidence (30/55=54.5%) between the first and second relation matrixes 72, 74 is considerably low. In particular, one cells of the difference matrix 86 of FIG. 26 contains the numeral value 2, for representing the opposite perceptions of the individuals A and B with respect to the same item pairs. Moreover, due to the relation ratings on three levels, even the difference of more than one level of the relation ratings leads to a relatively large difference.

However, the analyzing result appears on the graph 80 of FIG. 25, which represents aggregated thought system of the both individuals A and B generated according to the aggregated relation matrix 76 of FIG. 23, is not so much different from the corresponding graph 62 of FIG. 18 which represent the thought system of the solely individual A. This means that although the first and second relation matrixes 72, 74 for the individuals A and B differ in values of the relation ratings for the some item pairs, observation on eigen values of the matrixes 72, 74 which is obtained by the S.V.D, in other words, eigen vectors of the items, reveals that the both individuals A and B are similar in their arrangement of the items in their thought system, i.e., position vectors of the items. Therefore, it is recognized that the individuals A and B have an essentially similar recognition with respect to the items.

Further study of the graph 25 shows that the item "Luck" has a greater value of y-axis in comparison with that of the item "Success", whereas the graph 62 shows that the items "Luck" and "Success" have almost the same value of y-axis. This means that the individual A recognize the items "Luck" and "Success" as the similar items, while the individual B recognize the item "Luck" is more strongly concerned with the sixth sense matters e.g., the item "Gut feeling" than the item "Success", and is opposite to the scientific matters e.g., the item "Data to support".

As is apparent from the foregoing description, the thought system analyzing method and apparatus according to the present embodiment are capable of mathematically clarifying only a slight difference between the recognition of the individuals, which is less likely recognized by the discussion using the words. Namely, the present analyzing method and apparatus permit an analysis of the thought system of the subject consisting of a plurality of individuals based on not only the superficial difference but also the difference in a semantic meaning of the specific item between the individuals A and B. That is, the present analyzing method and apparatus is capable of extracting the difference between the individuals in essential dimensions of the thought systems.

In the present embodiment, the aggregated relation matrix 76 of FIG. 23 can be generated by simply summing up the first and second relation matrixes 72, 74 for the individuals A and B, since the thought systems of the individuals A and B are extremely similar to each other. Thus obtained aggregated matrix 76 can be used to generate the display matrix 78 of FIG. 24 which permits displaying the thought system as a common recognition of the individuals A and B. As mentioned above, the comparison between the graphs 62 and 80 aid the individuals to understand the difference such as the difference in the position of the item "Luck", assuring easy extraction of the difference between the individuals A and B in recognition of the items.

When the subject of the analysis may consist of a plurality of individuals having different thought systems, in contrast with above mentioned case, the thought system of the subject may be analyzed based on a aggregated relation matrix generated by summing up the different relation matrixes of respective individuals, like the above case. Alternatively, the thought system may be analyzed by separately analyzing the thought system of the respective individuals and preferably observing a difference between the individuals in an essential dimension axis or axes of the thought system thereof, or observing a deviation of the essential dimension axis or axes of the thought system of one individual from that of the though systems of the other individuals.

Referring back to FIG. 27, there is illustrated the graph 84 representing the analyzing result obtained by directly processing the juxtaposition relation matrix 70 of FIG. 22 with S.V.D, for example. The graph 84 is arranged to effectively indicate a difference between the individuals A and B in recognition of each item by means of a difference vector shown by an allow in the graph 84. As is apparent from the directions of allows of the graph 84, the individual B, in comparison with the individual A, is likely to draw the items located in the right side of the two dimensional coordinate to the left side, while being likely to draw the items located in the left side of the two dimensional coordinate to the upper side. Further, the individual B, in comparison with the individual A is likely to have a relatively small opinion of the items which contribute the x-axis, while having a relatively large opinion of items which contribute the y-axis. In particular, it is recognized that both of the individuals A and B commonly recognize the contrast between the scientific matters, e.g., item "Data to support" and the sixth sense matters e.g., item "Gut feeling". Especially, while the individual A is likely to distinguished strongly these two items from the other items located in the left side of the two dimensional coordinate of the graph 84. The above-described difference in thought system between the individuals A and B may be due to an influence of their educational backgrounds, that is, the individual A has an education in the business school in the U.S., while the individual B has not such a special education. The analyzing result of FIG. 27 is also useful for recognize the difference in recognition of each item between the individuals A and B, by observing the positional differences between the identical items. For instance, the positions of the items "Gut feeling" and "Data to support" and "Success" according to the recognition of the individual A are different from the positions of the corresponding items according to the recognition of the individual B. Thus, the graph 84 allows the individuals to notes the difference between the individuals A and B in recognition of the same items which may cause an nonconformity of the discussion with them, and to find out a specific index to amend these difference.

As is apparent from the analyzing result representing in the graph 84 of FIG. 27, the analyzing method and apparatus according to the present embodiment permits a clearly indication of the difference in thought system between the individuals A and B, not by using an superficial difference such as a linguistic difference, but by using an essential difference such as a difference of a dimensional-axis of the thought system. Accordingly, when the discussion does not come to a conclusion due to a presence of a slight difference in recognition of the specific word, between the individuals, the slight difference can be accurately analyzed by the present analyzing method and apparatus. Thus, the individuals can amends the extracted slight difference, effectively promoting the discussion.

While the thought system analyzing method and apparatus according to the third embodiment of the present invention has been described about the case where the though systems of the two individuals is analyzed, the present analyzing method and apparatus may be applicable to analyze thought systems of more than two individuals. For instance, the present analyzing method and apparatus can be used in a planing conference or a management conference in a company, for analyzing contents of discussion in the conference, assuring efficient promotion of the conference and accurate understanding of the individuals about the contents of the discussion. It should be noted that for analyzing the difference in the thought system between various individuals, the analyzing apparatus of the present invention may be arranged such that a selection of thought items is performed by all of the individuals cooperated with each other, while assignment of relation ratings to the all possible pairs is separately performed by each individual, like the foregoing embodiment. By way of example, the analyzing apparatus according to the present embodiment may be includes a plurality of terminal equipment for allowing the plurality of individuals to assign and input the relation ratings to the all possible pairs therethrough, respectively. The relation ratings inputted thought the terminal equipment are integrated and then preferably processed with a specific statistical method such as S.V.D. Further, the individuals are cooperated with each other to select the items as commonly perceived items and input these items into one analyzing apparatus. The selected items can be delivered from the analyzing apparatus to the terminal equipment via a communication network so as to display on the screen of the display of each terminal equipment. Alternatively, the analyzing apparatus of the present embodiment may be arranged such that the terminal equipment may be operable by the individuals to input the commonly perceived items or to access the analyzing apparatus to correct the inputted perceived items. The present analyzing apparatus is further arranged to display the inputted or corrected perceived items on the display device of each terminal equipment in real time.

While, the present invention has been described in detail above in its preferred embodiments, it is to be understood that the present invention is not limited to the details of the illustrated embodiments, but may be otherwise embodied.

For instance, the step of transforming the relation matrix to the display matrix may further employs a weighted matrix to externally process a specific vector component obtained by the singular value decomposition.

Further, the following three arrangements: 1) the sequence (SEQ) control matrix for controlling an order of making possible pairs of the items such that repetition of the items in the consecutive item pairs is avoided, 2) the step for displaying warning of the unacceptable ratings, and 3) the step of re-executing the routine for obtaining the relation ratings are not necessarily required, but may be employed as needed.

Moreover, the graphical user interfaces are not limited to the illustrated forms, but may be embodied in a variety of different forms.

It is to be understood that the present invention may be embodied with various other changes, modifications and improvements, which may occur to those skilled in the art, without departing from the spirit and scope of the present invention defined in the following claims:

What is claimed is:

1. A method of analyzing a thought system of a subject, said subject consisting of at least one individual and said method being implemented by a computing device, the method comprising the steps of:
   inputting a plurality of items perceived by said subject into the computing device;
   obtaining relationship information of all possible pairs of said items, based on perception of said subject with respect to relationship between two items of each of said all possible pairs of said items;
   generating a relation matrix of the plurality of items based on said relationship information of each of said items with respect to the all other items;
   generating a profile matrix by dividing each element of said relation matrix by a sum of said elements of said relation matrix;
   generating a transformed matrix by transforming said profile matrix based on a deviation of each element of said profile matrix from a corresponding expectation of said element of said profile matrix;
   transforming said transformed matrix to a display matrix projected on a representation space having dimensions lower than the number of said items and reflecting a relationship between said items perceived by said subject; and
   displaying said items on said representation space according to said display matrix such that said items are plotted on respective positions in said representation space and shown on an output device;
   wherein said step of obtaining relationship information further comprises the step of showing said subject only one pair of said all possible pairs of said items in order, for allowing said individual to assign said relationship information for each pair of said items, in the same order.

2. A method of analyzing a thought system of a subject according to claim 1, wherein said items are represented by language.

3. A method of analyzing a thought system of a subject according to claim 1, wherein said items belong to a single group conceptually undistinguishable.

4. A method of analyzing a thought system of a subject according to claim 1, wherein said step of obtaining items is executed to obtain about 5-20 items.

5. A method of analyzing a thought system of a subject according to claim 1, wherein said step of obtaining said plurality of items is arranged to obtain successively said items from said subject, while all of said items previously obtained are shown to said subject.

6. A method of analyzing a thought system of a subject according to claim 1, wherein said relationship information consists of rating of relationship between said two items of each of said all possible pairs of said items.

7. A method of analyzing a thought system of a subject according to claim 6, wherein said rating of relationship consists of a plurality of rating concepts representing different degrees of said relationship.

8. A method of analyzing a thought system of a subject according to claim 7, wherein said plurality of rating concepts comprise "small", "medium" and "large."

9. A method of analyzing a thought system of a subject according to claim 1, further comprising the step of detecting a unique item having no relationship to all other items based on said relationship information, and deleting said unique item from said items so as to regenerate said relation matrix.

10. A method of analyzing a thought system of a subject according to claim 1, further comprising the steps of determining whether said relationship information is biased, and displaying a warning to said subject if said relationship information is biased, while comprising the step of initializing said step of obtaining said relationship information so as to recommence said step of obtaining said relationship information, as needed.

11. A method of analyzing a thought system of a subject according to claim 1, wherein said items perceived by said subject are qualitative data, while said relationship information are processed as quantitative data in said step of transforming said transformed matrix to said display matrix.

12. A method of analyzing a thought system of a subject according to claim 1, wherein order of showing said one pair of items of said all possible pairs is arranged to avoid repetition of each item in consecutive pairs.

13. A method of analyzing a thought system of a subject according to claim 1, wherein said step of obtaining said plurality of items and said step of obtaining said relationship information are performed successively by said individuals in a substantially continuous time.

14. A method of analyzing a thought system of a subject according to claim 1, wherein said step of generating said relation matrix is arranged for generating said relation matrix by using values of said relationship information, said relationship information being assigned to each of said items for representing the relationship with respect to said all other items, and being set to respective elements of said relation matrix.

15. A method of analyzing a thought system of a subject according to claim 1, said step of transforming said transformed matrix to said display matrix, comprising a step of performing a singular value decomposition.

16. A method of analyzing a thought system of a subject according to claim 1, further comprising a step of arranging said display matrix such that values of elements of said display matrix to be weighted with respect to a specific dimension.

17. A method of analyzing a thought system of a subject according to claim 1, wherein said representation space consists of a two or three dimensional coordinate domain, and said step of displaying said items is arranged for plotting items on a corresponding position in said coordinate domain, according to said display matrix.

18. A method of analyzing a thought system of a subject according to claim 17, wherein each of said items plotted on said coordinate domain is depicted by an object the size of which corresponds to the value of relativity of said item with respect to the all other items.

19. A method of analyzing a thought system of a subject according to claim 17, wherein each of said items plotted on said coordinate domain is depicted by an object the size of which corresponds to a value of relativity of said item with respect to one of said dimension axis.

20. A method of analyzing thoughts of at least one individual according to claim 1, wherein said step of transforming said transformed matrix to said display matrix further comprises the step of storing a data of said display matrix.

21. A method of analyzing a thought system of a subject according to claim 1, further comprises the step of performing a cluster analysis using said display matrix, so as to separate said items into groups, the number of said groups being smaller than the total number of said items.

22. A method of analyzing a thought system of a subject, according to claim 1, wherein said subject consists of a plurality of individuals, said step of obtaining said plurality of items is performed for obtaining a plurality of items commonly perceived by said plurality of individuals, said step of obtaining relationship information is separately performed by said plurality of individuals for obtaining a plurality sets of relationship information based on perceptions of each of said individuals with respect to all possible pairs of said items, and said step of generating a relation matrix is performed for generating a aggregated relation matrix for said subject, by summing up said plurality sets of relation matrixes of said plurality of individuals.

23. A method of analyzing a thought system of a subject according to claim 1, wherein said subject consists of a plurality of individuals, and said step of obtaining said relation matrix is performed by said plurality of individuals such that said plurality of individuals share all possible pairs of said items to assign said relationship information to said all possible pairs of items.

24. A method of analyzing a thought system of a subject according to claim 1, wherein said subject consists of a plurality of individuals, said step of obtaining said plurality of items is performed for obtaining a plurality of items commonly perceived by said plurality of individuals, said step of obtaining relationship information is separately performed by said plurality of individuals for obtaining a plurality sets of relationship information based on perceptions of each of said individuals with respect to all possible pairs of said items, said step of generating a relation matrix is performed for generating a plurality of relation matrixes based on said plurality sets of relationship information, and for generating a juxtaposition relation matrix wherein said plurality of relation matrixes are juxtaposed; said step of generating said profile matrix is performed by dividing each element of said juxtaposition relation matrix by a sum of said elements of said juxtaposition relation matrix, and said step of displaying said display matrix is performed for plotting said items on respective positions of said representation space according to said plurality of relation matrixes for the respective individuals, and indicating the positional differences between said items obtained by one of said plurality of individuals and said items obtained by another of said plurality of individuals.

25. A method of analyzing a thought system of a subject, said subject consisting of at least one individual, comprising the steps of:
a first step of analyzing said thought system arranged for performing said analyzing methods recited in claim 1;
a second step of analyzing said thought system arranged for performing steps of selecting at least one of said items obtained in said first step, obtaining a plurality of items perceived by said subject with respect to said selected items, and analyzing said plurality of items according to said analyzing methods.

26. A method of analyzing a thought system of a subject, said subject consisting of at least one individual and said method being implemented by a computing device, the method comprising the steps of:
inputting a plurality of items perceived by said subject into the computing device;
obtaining relationship information of all possible pairs of said items, based on perception of said subject with respect to relationship between two items of each of said all possible pairs of said items;
generating a relation matrix of the plurality of items based on said relationship information of each of said items with respect to the all other items;
generating a profile matrix by dividing each element of said relation matrix by a sum of said elements of said relation matrix;
generating a transformed matrix by transforming said profile matrix based on a deviation of each element of said profile matrix from a corresponding expectation of said element of said profile matrix;
transforming said transformed matrix to a display matrix projected on a representation space having dimensions lower than the number of said items and reflecting a relationship between said items perceived by said subject; and
displaying said items on said representation space according to said display matrix such that said items are plotted on respective positions in said representation space and shown on an output device;
wherein said items perceived by said subject are qualitative data, while said relationship information are processed as quantitative data in said step of transforming said transformed matrix to said display matrix.

27. A method of analyzing a thought system of a subject according to claim 26, wherein said items are represented by language.

28. A method of analyzing a thought system of a subject according to claim 26, wherein said items belong to a single group conceptually undistinguishable.

29. A method of analyzing a thought system of a subject according to claim 26, wherein said step of obtaining items is executed to obtain about 5-20 items.

30. A method of analyzing a thought system of a subject according to claim 26, wherein said step of obtaining said plurality of items is arranged to obtain successively said items from said subject, while all of said items previously obtained are shown to said subject.

31. A method of analyzing a thought system of a subject according to claim 26, said step of obtaining relationship information further comprising the step of showing said subject only one pair of said all possible pairs of said items in order, for allowing said individual to assign said relationship information for each pair of said items, in the same order.

32. A method of analyzing a thought system of a subject according to claim 31, wherein order of showing said one pair of items of said all possible pairs is arranged to avoid repetition of each item in consecutive pairs.

33. A method of analyzing a thought system of a subject according to claim 26, wherein said relationship information consists of rating of relationship between said two items of each of said all possible pairs of said items.

34. A method of analyzing a thought system of a subject according to claim 33, wherein said rating of relationship consists of a plurality of rating concepts representing different degrees of said relationship.

35. A method of analyzing a thought system of a subject according to claim 34, wherein said plurality of rating concepts comprise "small", "medium" and "large."

36. A method of analyzing a thought system of a subject according to claim 26, further comprising the step of detecting a unique item having no relationship to all other items based on said relationship information, and deleting said unique item from said items so as to regenerate said relation matrix.

37. A method of analyzing a thought system of a subject according to claim 26, further comprising the steps of determining whether said relationship information is biased, and displaying a warning to said subject if said relationship information is biased, while comprising the step of initializing said step of obtaining said relationship information so as to recommence said step of obtaining said relationship information, as needed.

38. A method of analyzing a thought system of a subject according to claim 26, wherein said step of obtaining said plurality of items and said step of obtaining said relationship information are performed successively by said individuals in a substantially continuous time.

39. A method of analyzing a thought system of a subject according to claim 26, wherein said step of generating said relation matrix is arranged for generating said relation matrix by using values of said relationship information, said relationship information being assigned to each of said items for representing the relationship with respect to said all other items, and being set to respective elements of said relation matrix.

40. A method of analyzing a thought system of a subject according to claim 26, said step of transforming said transformed matrix to said display matrix, comprising a step of performing a singular value decomposition.

41. A method of analyzing a thought system of a subject according to claim 26, further comprising a step of arranging said display matrix such that values of elements of said display matrix to be weighted with respect to a specific dimension.

42. A method of analyzing a thought system of a subject according to claim 26, wherein said representation space consists of a two or three dimensional coordinate domain, and said step of displaying said items is arranged for plotting items on a corresponding position in said coordinate domain, according to said display matrix.

43. A method of analyzing a thought system of a subject according to claim 42, wherein each of said items plotted on said coordinate domain is depicted by an object the size of which corresponds to the value of relativity of said item with respect to the all other items.

44. A method of analyzing a thought system of a subject according to claim 43, wherein each of said items plotted on said coordinate domain is depicted by an object the size of which corresponds to a value of relativity of said item with respect to one of said dimension axis.

45. A method of analyzing thoughts of at least one individual according to claim 26, wherein said step of transforming said transformed matrix to said display matrix further comprises the step of storing a data of said display matrix.

46. A method of analyzing a thought system of according to claim 26, further comprises the step of performing a cluster analysis using said display matrix, so as to separate said items into groups, the number of said groups being smaller than the total number of said items.

47. A method of analyzing a thought system of a subject, according to claim 26, wherein said subject consists of a plurality of individuals, said step of obtaining said plurality of items is performed for obtaining a plurality of items commonly perceived by said plurality of individuals, said step of obtaining relationship information is separately performed by said plurality of individuals for obtaining a plurality sets of relationship information based on perceptions of each of said individuals with respect to all possible pairs of said items, and said step of generating a relation matrix is performed for generating a aggregated relation matrix for said subject, by summing up said plurality sets of relation matrixes of said plurality of individuals.

48. A method of analyzing a thought system of a subject according to claim 26, wherein said subject consists of a plurality of individuals, and said step of obtaining said relation matrix is performed by said plurality of individuals such that said plurality of individuals share all possible pairs of said items to assign said relationship information to said all possible pairs of items.

49. A method of analyzing a thought system of a subject according to claim 26, wherein said subject consists of a plurality of individuals, said step of obtaining said plurality of items is performed for obtaining a plurality of items commonly perceived by said plurality of individuals, said step of obtaining relationship information is separately performed by said plurality of individuals for obtaining a plurality sets of relationship information based on perceptions of each of said individuals with respect to all possible pairs of said items, said step of generating a relation matrix is performed for generating a plurality of relation matrixes based on said plurality sets of relationship information, and for generating a juxtaposition relation matrix wherein said plurality of relation matrixes are juxtaposed; said step of generating said profile matrix is performed by dividing each element of said juxtaposition relation matrix by a sum of said elements of said juxtaposition relation matrix, and said step of displaying said display matrix is performed for plotting said items on respective positions of said representation space according to said plurality of relation matrixes for the respective individuals, and indicating the positional differences between said items obtained by one of said plurality of individuals and said items obtained by another of said plurality of individuals.

50. A method of analyzing a thought system of a subject, said subject consisting of at least one individual, comprising the steps of:
  a first step of analyzing said thought system arranged for performing said analyzing methods recited in claim 26;
  a second step of analyzing said thought system arranged for performing steps of selecting at least one of said items obtained in said first step, obtaining a plurality of items perceived by said subject with respect to said selected items, and analyzing said plurality of items according to said analyzing methods.

51. A method of analyzing a thought system of a subject, said subject consisting of at least one individual and said method being implemented by a computing device, the method comprising the steps of:
  inputting a plurality of items perceived by said subject into a computing device;
  obtaining relationship information of all possible pairs of said items, based on perception of said subject with respect to relationship between two items of each of said all possible pairs of said items;
  generating a relation matrix of the plurality of items based on said relationship information of each of said items with respect to the all other items;
  generating a profile matrix by dividing each element of said relation matrix by a sum of said elements of said relation matrix;
  generating a transformed matrix by transforming said profile matrix based on a deviation of each element of said profile matrix from a corresponding expectation of said element of said profile matrix;
  transforming said transformed matrix to a display matrix projected on a representation space having dimensions lower than the number of said items and reflecting a relationship between said items perceived by said subject; and
  displaying said items on said representation space according to said display matrix such that said items are plotted on respective positions in said representation space and shown on an output device;

wherein said step of generating said relation matrix is arranged for generating said relation matrix by using values of said relationship information, said relationship information being assigned to each of said items for representing the relationship with respect to said all other items, and being set to respective elements of said relation matrix.

52. A method of analyzing a thought system of a subject according to claim 51, wherein said items are represented by language.

53. A method of analyzing a thought system of a subject according to claim 51, wherein said items belong to a single group conceptually undistinguishable.

54. A method of analyzing a thought system of a subject according to claim 51, wherein said step of obtaining items is executed to obtain about 5-20 items.

55. A method of analyzing a thought system of a subject according to claim 51, wherein said step of obtaining said plurality of items is arranged to obtain successively said items from said subject, while all of said items previously obtained are shown to said subject.

56. A method of analyzing a thought system of a subject according to claim 51, said step of obtaining relationship information further comprising the step of showing said subject only one pair of said all possible pairs of said items in order, for allowing said individual to assign said relationship information for each pair of said items, in the same order.

57. A method of analyzing a thought system of a subject according to claim 56, wherein order of showing said one pair of items of said all possible pairs is arranged to avoid repetition of each item in consecutive pairs.

58. A method of analyzing a thought system of a subject according to claim 51, wherein said relationship information consists of rating of relationship between said two items of each of said all possible pairs of said items.

59. A method of analyzing a thought system of a subject according to claim 58, wherein said rating of relationship consists of a plurality of rating concepts representing different degrees of said relationship.

60. A method of analyzing a thought system of a subject according to claim 59, wherein said plurality of rating concepts comprise "small", "medium" and "large."

61. A method of analyzing a thought system of a subject according to claim 51, further comprising the step of detecting a unique item having no relationship to all other items based on said relationship information, and deleting said unique item from said items so as to regenerate said relation matrix.

62. A method of analyzing a thought system of a subject according to claim 51, further comprising the steps of determining whether said relationship information is biased, and displaying a warning to said subject if said relationship information is biased, while comprising the step of initializing said step of obtaining said relationship information so as to recommence said step of obtaining said relationship information, as needed.

63. A method of analyzing a thought system of a subject according to claim 51, wherein said items perceived by said subject are qualitative data, while said relationship information are processed as quantitative data in said step of transforming said transformed matrix to said display matrix.

64. A method of analyzing a thought system of a subject according to claim 51, wherein said step of obtaining said plurality of items and said step of obtaining said relationship information are performed successively by said individuals in a substantially continuous time.

65. A method of analyzing a thought system of a subject according to claim 51, said step of transforming said transformed matrix to said display matrix, comprising a step of performing a singular value decomposition.

66. A method of analyzing a thought system of a subject according to claim 51, further comprising a step of arranging said display matrix such that values of elements of said display matrix to be weighted with respect to a specific dimension.

67. A method of analyzing a thought system of a subject according to claim 51, wherein said representation space consists of a two or three dimensional coordinate domain, and said step of displaying said items is arranged for plotting items on a corresponding position in said coordinate domain, according to said display matrix.

68. A method of analyzing a thought system of a subject according to claim 67, wherein each of said items plotted on said coordinate domain is depicted by an object the size of which corresponds to the value of relativity of said item with respect to the all other items.

69. A method of analyzing a thought system of a subject according to claim 67, wherein each of said items plotted on said coordinate domain is depicted by an object the size of which corresponds to a value of relativity of said item with respect to one of said dimension axis.

70. A method of analyzing thoughts of at least one individual according to claim 51, wherein said step of transforming said relation transformed matrix to said display matrix further comprises the step of storing a data of said display matrix.

71. A method of analyzing a thought system of according to claim 51, further comprises the step of performing a cluster analysis using said display matrix, so as to separate said items into groups, the number of said groups being smaller than the total number of said items.

72. A method of analyzing a thought system of a subject, according to claim 51, wherein said subject consists of a plurality of individuals, said step of obtaining said plurality of items is performed for obtaining a plurality of items commonly perceived by said plurality of individuals, said step of obtaining relationship information is separately performed by said plurality of individuals for obtaining a plurality sets of relationship information based on perceptions of each of said individuals with respect to all possible pairs of said items, and said step of generating a relation matrix is performed for generating a aggregated relation matrix for said subject, by summing up said plurality sets of relation matrixes of said plurality of individuals.

73. A method of analyzing a thought system of a subject according to claim 51, wherein said subject consists of a plurality of individuals, and said step of obtaining said relation matrix is performed by said plurality of individuals such that said plurality of individuals share all possible pairs of said items to assign said relationship information to said all possible pairs of items.

74. A method of analyzing a thought system of a subject according to claim 51, wherein said subject consists of a plurality of individuals, said step of obtaining said plurality of items is performed for obtaining a plurality of items commonly perceived by said plurality of individuals, said step of obtaining relationship information is separately performed by said plurality of individuals for obtaining a plurality sets of relationship information based on perceptions of each of said individuals with respect to all possible pairs of said items, said step of generating a relation matrix is performed for generating a plurality of relation matrixes based on said plurality sets of relationship information, and for generating a juxtaposition relation matrix wherein said plurality of relation matrixes are juxtaposed; said step of generating said profile matrix is performed by dividing each element of said juxtaposition relation matrix by a sum of said elements of said juxtaposition relation matrix, and said step of displaying said display matrix is performed for plotting said items on respective positions of said representation space according to said plurality of relation matrixes for the respective individuals, and indicating the positional differences between said items obtained by one of said plurality of individuals and said items obtained by another of said plurality of individuals.

75. A method of analyzing a thought system of a subject, said subject consisting of at least one individual, comprising the steps of:
a first step of analyzing said thought system arranged for performing said analyzing methods recited in claim 51;
a second step of analyzing said thought system arranged for performing steps of selecting at least one of said items obtained in said first step, obtaining a plurality of items perceived by said subject with respect to said selected items, and analyzing said plurality of items according to said analyzing methods.

76. A method of analyzing a thought system of a subject, said subject consisting of at least one individual and being implemented by a computing device, comprising the steps of:
inputting a plurality of items perceived by said subject into the computing device;
obtaining relationship information of all possible pairs of said items, based on perception of said subject with respect to relationship between two items of each of said all possible pairs of said items;
generating a relation matrix of the plurality of items based on said relationship information of each of said items with respect to the all other items;
generating a profile matrix by dividing each element of said relation matrix by a sum of said elements of said relation matrix;
generating a transformed matrix by transforming said profile matrix based on a deviation of each element of said profile matrix from a corresponding expectation of said element of said profile matrix;
transforming said transformed matrix to a display matrix projected on a representation space having dimensions lower than the number of said items and reflecting a relationship between said items perceived by said subject; and
displaying said items on said representation space according to said display matrix such that said items are plotted on respective positions in said representation space and shown on an output device;
wherein said representation space consists of a two or three dimensional coordinate domain, and said step of displaying said items is arranged for plotting items on a corresponding position in said coordinate domain, according to said display matrix.

77. A method of analyzing a thought system of a subject according to claim 76, wherein said items are represented by language.

78. A method of analyzing a thought system of a subject according to claim 76, wherein said items belong to a single group conceptually undistinguishable.

79. A method of analyzing a thought system of a subject according to claim 76, wherein said step of obtaining items is executed to obtain about 5-20 items.

80. A method of analyzing a thought system of a subject according to claim 76, wherein said step of obtaining said plurality of items is arranged to obtain successively said items from said subject, while all of said items previously obtained are shown to said subject.

81. A method of analyzing a thought system of a subject according to claim 76, said step of obtaining relationship information further comprising the step of showing said subject only one pair of said all possible pairs of said items in order, for allowing said individual to assign said relationship information for each pair of said items, in the same order.

82. A method of analyzing a thought system of a subject according to claim 81, wherein order of showing said one pair of items of said all possible pairs is arranged to avoid repetition of each item in consecutive pairs.

83. A method of analyzing a thought system of a subject according to claim 76, wherein said relationship information consists of rating of relationship between said two items of each of said all possible pairs of said items.

84. A method of analyzing a thought system of a subject according to claim 83, wherein said rating of relationship consists of a plurality of rating concepts representing different degrees of said relationship.

85. A method of analyzing a thought system of a subject according to claim 84, wherein said plurality of rating concepts comprise "small", "medium" and "large".

86. A method of analyzing a thought system of a subject according to claim 76, further comprising the step of detecting a unique item having no relationship to all other items based on said relationship information, and deleting said unique item from said items so as to regenerate said relation matrix.

87. A method of analyzing a thought system of a subject according to claim 76, further comprising the steps of determining whether said relationship information is biased, and displaying a warning to said subject if said relationship information is biased, while comprising the step of initializing said step of obtaining said relationship information so as to recommence said step of obtaining said relationship information, as needed.

88. A method of analyzing a thought system of a subject according to claim 76, wherein said items perceived by said subject are qualitative data, while said relationship information are processed as quantitative data in said step of transforming said transformed matrix to said display matrix.

89. A method of analyzing a thought system of a subject according to claim 76, wherein said step of obtaining said plurality of items and said step of obtaining said relationship information are performed successively by said individuals in a substantially continuous time.

90. A method of analyzing a thought system of a subject according to claim 76, wherein said step of generating said relation matrix is arranged for generating said relation matrix by using values of said relationship information, said relationship information being assigned to each of said items for representing the relationship with respect to said all other items, and being set to respective elements of said relation matrix.

91. A method of analyzing a thought system of a subject according to claim 76, said step of transforming said transformed matrix to said display matrix, comprising a step of performing a singular value decomposition.

92. A method of analyzing a thought system of a subject according to claim 76, further comprising a step of arranging said display matrix such that values of elements of said display matrix to be weighted with respect to a specific dimension.

93. A method of analyzing a thought system of a subject according to claim 92, wherein each of said items plotted on said coordinate domain is depicted by an object the size of which corresponds to the value of relativity of said item with respect to the all other items.

94. A method of analyzing a thought system of a subject according to claim 92, wherein each of said items plotted on said coordinate domain is depicted by an object the size of which corresponds to a value of relativity of said item with respect to one of said dimension axis.

95. A method of analyzing thoughts of at least one individual according to claim 76, wherein said step of transforming said transformed matrix to said display matrix further comprises the step of storing a data of said display matrix.

96. A method of analyzing a thought system of according to claim 76, further comprises the step of performing a cluster analysis using said display matrix, so as to separate said items into groups, the number of said groups being smaller than the total number of said items.

97. A method of analyzing a thought system of a subject, according to claim 76, wherein said subject consists of a plurality of individuals, said step of obtaining said plurality of items is performed for obtaining a plurality of items commonly perceived by said plurality of individuals, said step of obtaining relationship information is separately performed by said plurality of individuals for obtaining a plurality sets of relationship information based on perceptions of each of said individuals with respect to all possible pairs of said items, and said step of generating a relation matrix is performed for generating a aggregated relation matrix for said subject, by summing up said plurality sets of relation matrixes of said plurality of individuals.

98. A method of analyzing a thought system of a subject according to claim 76, wherein said subject consists of a plurality of individuals, and said step of obtaining said relation matrix is performed by said plurality of individuals such that said plurality of individuals share all possible pairs of said items to assign said relationship information to said all possible pairs of items.

99. A method of analyzing a thought system of a subject according to claim 76, wherein said subject consists of a plurality of individuals, said step of obtaining said plurality of items is performed for obtaining a plurality of items commonly perceived by said plurality of individuals, said step of obtaining relationship information is separately performed by said plurality of individuals for obtaining a plurality sets of relationship information based on perceptions of each of said individuals with respect to all possible pairs of said items, said step of generating a relation matrix is performed for generating a plurality of relation matrixes based on said plurality sets of relationship information, and for generating a juxtaposition relation matrix wherein said plurality of relation matrixes are juxtaposed; said step of generating said profile matrix is performed by dividing each element of said juxtaposition relation matrix by a sum of said elements of said juxtaposition relation matrix, and said step of displaying said display matrix is performed for plotting said items on respective positions of said representation space according to said plurality of relation matrixes for the respective individuals, and indicating the positional differences between said items obtained by one of said plurality of individuals and said items obtained by another of said plurality of individuals.

100. A method of analyzing a thought system of a subject, said subject consisting of at least one individual, comprising the steps of:

a first step of analyzing said thought system arranged for performing said analyzing methods recited in claim 76;

a second step of analyzing said thought system arranged for performing steps of selecting at least one of said items obtained in said first step, obtaining a plurality of items perceived by said subject with respect to said selected items, and analyzing said plurality of items according to said analyzing methods.

* * * * *